US009665787B2

(12) United States Patent
Zhou et al.

(10) Patent No.: US 9,665,787 B2
(45) Date of Patent: May 30, 2017

(54) METHOD AND APPARATUS OF EXTRACTING PARTICULAR INFORMATION FROM STANDARD CARD

(71) Applicant: Alibaba Group Holding Limited, Grand Cayman (KY)

(72) Inventors: Shiqi Zhou, Hangzhou (CN); Rufeng Chu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 14/703,691

(22) Filed: May 4, 2015

(65) Prior Publication Data

US 2015/0317529 A1 Nov. 5, 2015

(30) Foreign Application Priority Data

May 4, 2014 (CN) .......................... 2014 1 0183623

(51) Int. Cl.
*G06K 9/20* (2006.01)
*G06K 9/18* (2006.01)
G06K 9/36 (2006.01)

(52) U.S. Cl.
CPC .............. *G06K 9/18* (2013.01); *G06K 9/2054* (2013.01); *G06K 2009/363* (2013.01); *G06K 2209/01* (2013.01)

(58) Field of Classification Search
CPC ................................. G06K 9/18; G06K 9/2054
See application file for complete search history.

(56) References Cited

U.S. PATENT DOCUMENTS

| 2006/0082595 | A1* | 4/2006 | Liu ..................... G06K 9/00449 345/629 |
| 2010/0082485 | A1 | 4/2010 | Lin et al. |
| 2011/0013021 | A1 | 1/2011 | Hongo |
| 2011/0123114 | A1 | 5/2011 | Hwang et al. |
| 2013/0287265 | A1* | 10/2013 | Nepomniachtchi ........................ G06K 9/00442 382/115 |
| 2013/0308865 | A1 | 11/2013 | Shibata |

(Continued)

OTHER PUBLICATIONS

Wikipedia, 'Homography (Computer Vision)' [online], 2016, [retrieved on Oct. 17, 2016]. Retrieved from the Internet <URL: https://en.wikipedia.org/wiki/Homography_(computer_vision)>, p. 1.*

(Continued)

*Primary Examiner* — David F Dunphy
(74) *Attorney, Agent, or Firm* — Lee & Hayes, PLLC

(57) ABSTRACT

A method of extracting particular information in a standard card is disclosed herein. The method includes: acquiring a card image of a standard card having particular information to be extracted; identifying an image region containing the particular information in the card image; and extracting and outputting the image region as an independent image. Thus, an image related to the part of the particular information only can be obtained from the standard card conveniently, quickly and accurately, thereby improving the working efficiency. In addition, the present disclosure further provides an apparatus of extracting particular information in a standard card and a method of inputting particular information of a standard card in a mobile terminal.

19 Claims, 18 Drawing Sheets

(56) References Cited

U.S. PATENT DOCUMENTS

| 2014/0036099 A1 | 2/2014 | Balassanian |
| 2014/0143143 A1 | 5/2014 | Fasoli et al. |
| 2014/0270573 A1* | 9/2014 | Ishizaka ............ G06K 9/00449 382/296 |
| 2015/0001300 A1 | 1/2015 | Kumar et al. |
| 2015/0003666 A1* | 1/2015 | Wang ................ G06K 9/00463 382/100 |
| 2015/0003748 A1 | 1/2015 | Kumar et al. |
| 2015/0006362 A1 | 1/2015 | Mitchell et al. |

OTHER PUBLICATIONS

Bernd Jahne, 'Practical Handbook on Image Processing for Scientific and Technical Applications,' 2004, CRC Press, Second Edition, p. 273.*

PCT Search Report and Written Opinion mailed Jul. 29, 2015 for PCT application No. PCT/US2015/029095.

* cited by examiner 4892 26 72 8037 2304

FIG. 11

METHOD AND APPARATUS OF EXTRACTING PARTICULAR INFORMATION FROM STANDARD CARD

CROSS REFERENCE TO RELATED PATENT APPLICATION

This application claims foreign priority to Chinese Patent Application No. 201410183623.7 filed on May 4, 2014, entitled "Method and Apparatus of Extracting Particular Information from Standard Card", which is hereby incorporated by reference in its entirety.

TECHNICAL FIELD

The present disclosure relates to the field of computer application technologies, and in particular to methods and apparatuses of extracting particular information from a standard card, and on this basis, the present disclosure further provides a method of inputting particular information in a standard card on a mobile terminal.

BACKGROUND

With the development of society, cards such as: bank cards, medical insurance cards and membership cards, are widely applied in life and work due to the advantage of portability. These cards have standard card attributes and relevant information. For instance, a bank card records a bank card number, a valid date and the like, and generally dimensions thereof are 53.98 mm in width and 85.6 mm in length.

In the era of the mobile Internet, payment methods such as mobile payment or electronic wallet provide convenience to services of life. A payment method via a mobile terminal has widely been used in daily lives. For most mobile payment methods, a bank card (such as a debit card or a credit card) needs to be bound before a payment function is used. Thus, a bank card number needs to be inputted into a mobile terminal. Since a relatively large pieces of information are recorded with the bank card number, such as an opening bank, a personal identity of a card owner, a card type and a check code, etc., correspondingly a relatively large number of digits exist in the bank card number, thus causing problems such as a high error rate due to a tedious input.

A provision of a method that is capable of automatically extracting and outputting an image region of relevant information from a card becomes a key to solving the aforementioned technical problem.

With respect to the aforementioned technical problem, the following implementations exist currently: 1) implementing by manually inputting card number information; 2) implementing by scanning a two-dimensional code that is set on a card surface through a mobile terminal; and 3) automatically acquiring a card number using an OCR (Optical Character Recognition) technology and automatically inputting thereof at corresponding positions of a mobile terminals.

When the first method is adopted, the user needs to perform an input into a phone screen while referencing a bank card. However, since a bank card number is comparatively long and is tedious to be inputted, an input error easily occurs.

When a user adopts the second method, bank card surface information needs to be printed on a surface of a bank card first, and then during an acquisition of information of the bank card, a camera device of a mobile terminal is used to scan a two-dimensional code of the bank card to acquire the card surface information such as a card number. However, using this method needs to print a two-dimensional code on a bank card on the one hand (thus existing bank cards having no two-dimensional codes need to be replaced, which causes an increase in cost), and needs to use an identification device to complete information identification on the other hand (since the two-dimensional code is not intuitive information) of the information. Furthermore, an image of the two-dimensional code image needs to be put in a scanning frame during the identification, and therefore this method is not only limited by usage conditions, but also limited by a shooting angle, having a relatively poor user experience.

When the third method is adopted, due to the influence of an error rate of OCR (Optical Character Recognition) identification, a user needs to compare a bank card with an identification result displayed on a mobile terminal one by one after the identification is completed, thus reducing the working efficiency.

In order to solve the above problems, a provision of a method that is capable of inputting particular information on a card into a mobile terminal in a convenient and accurate manner is desirable.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method of extracting particular information from a standard card. The method is capable of extracting and outputting an image region including only desired particular information according to a demand for the particular information in a standard card, thus reducing an error rate of outputting the particular information.

The present disclosure provides an apparatus of extracting particular information from a standard card, with relevant parameters and shape information of the standard card being determined based on a standard card template image, which includes: acquiring a card image of the standard card having particular information to be extracted; identifying an image region containing the particular information in the card image; and extracting and outputting the image region as an independent image.

In an embodiment, acquiring the card image of the standard card with the particular information to be extracted may include: acquiring a source image of the card image of the standard card having the particular information to be extracted; defining a region of the card image in the source image; and extracting image information of the region as the card image of the standard card having the particular information to be extracted.

In an embodiment, defining the region of the card image in the source image may include: extracting image elements which are straight line segments and have a length greater than a set threshold from the source image; combining the extracted straight line segments and determining combination(s) of line segments capable of forming a quadrilateral;

for the combination(s) of line segments capable of forming the quadrilateral, extending respective lengths of four line segments of each combination and determining each position of intersection points of the respective line segments; using each intersection point of the line segments being within a range of the source image as a first condition, selecting a combinations of line segments that satisfy the condition; determining whether only one combination of line segments that satisfies the first condition exists, and going to a next act if affirmative; and defining a region framed by the combination of line segments as the region of the card image in the source image.

In an embodiment, if a determination result is negative in the determination of whether only one combination of line segments that satisfies the first condition exists, the following acts may be performed: extracting all combinations of line segments that satisfy the first condition; filtering the combinations of line segments that satisfy the first condition according to a second condition as follows: determining whether intersection points of line segments in a combination of line segments are on extension lines of the line segments, and using the combination of line segments as a candidate combination of line segments if affirmative; and determining whether only one candidate combination of line segments exists, and defining a region framed by the candidate combination of line segments as the region of the card image in the source image if affirmative.

The present disclosure further provides a method that is capable of conveniently and accurately inputting particular information on a card into a mobile terminal.

In an embodiment, if a determination result is negative in the determination of whether only one candidate combination of line segments exists, filtering the candidate combinations of line segments using an approach as follows: acquiring intersection points of line segments in a combination of line segments, the combination of line segments including four intersection points; obtaining image coordinates of the four intersection points; mapping the image coordinates of the four intersection points to image coordinates of four points of the standard card template image to obtain a homography matrix; using the homography matrix and using the intersection points in the four intersection points as original points to form two line segments of the intersection points as X and Y axes; computing unit vectors of X' and Y' axes corresponding to the X and Y axes in an image after a homography matrix transformation; computing a degree of an included angle between the unit vectors; determining, in the combination of line segments, whether a difference between the acquired included angle that is between the unit vectors and ninety degrees is less than a preset threshold; and defining a region framed by the combination of line segments as the region of the card image in the source image if affirmative.

In an embodiment, identifying the image region containing the particular information in the card image may include: acquiring relative position parameters which reflect a relative position of the particular information on the standard card according to parameters of a standard card template image; performing a homography matrix transformation on the card image according to a shape of the standard card template image to acquire a transformed card image; and clipping an image region in conformity with the relative position parameters on the transformed card image according to the relative position parameters of the particular information on the standard card template, the image region being the image region containing the particular information.

In an embodiment, identifying the image region containing the particular information in the card image may adopt the following method: performing a homography matrix transformation on the card image according to the standard card template image to acquire a transformed card image; filtering the standard card template image to acquire a filtered standard card template image; according to a recording direction of the particular information to be extracted acquiring a first pixel value summation distribution diagram of the standard card template image in the recording direction; filtering the transformed card image to acquire a filtered card image; performing a pixel value summation computation in the recording direction on the filtered card image based on the recording direction of the particular information to acquire a second pixel value summation distribution diagram of the card image in the recording direction; comparing the second pixel value summation distribution diagram with the first pixel value summation distribution diagram; and finding, in the second pixel value summation distribution diagram, a position having a same pixel value summation feature in the recording direction of the particular information in the first pixel value summation distribution diagram, and identifying thereof as the image region containing the particular information in the card image.

In an embodiment, the standard card is a bank card, the particular information is a card number, and a peak region of the second pixel value summation distribution diagram is taken as the image region containing the particular information.

In an embodiment, the card number is produced by embossing.

In an embodiment, in the act of finding the position having the same pixel value summation feature in the recording direction of the particular information in the pixel value summation distribution diagram of the standard card template image, the relative position parameters of the particular information on the standard card template are further referenced.

In an embodiment, identifying the image region containing the particular information in the card image may include: performing a homography matrix transformation on the card image according to a shape of a standard card template image to acquire a transformed card image; determining a size occupied by the particular information of the standard card template image in the standard card template image according to parameters of the standard card template image; filtering the transformed card image to acquire a filtered card image; based on a recording direction of the particular information, performing a pixel value summation computation in the recording direction on the filtered card image to acquire a pixel value summation distribution diagram of the card image in the recording direction; determining a range region of the particular information on the pixel value summation distribution diagram according to the size occupied by the particular information in the standard card template image; and mapping a position of the particular information in the pixel value summation distribution diagram to the transformed card image, and extracting the image region containing the particular information from the transformed card image within the range region.

In an embodiment, identifying the image region containing the particular information in the card image may include: performing a homography matrix transformation on the card image according to a shape of a standard card template image to acquire a transformed card image; determining a size occupied by the particular information of the standard card template image in the standard card template image according to parameters of the standard card template image; filtering the transformed card image to acquire a filtered card image; based on a recording direction of the particular information, performing a pixel value summation computation in the recording direction on the filtered card image to acquire a pixel value summation distribution diagram of the card image in the recording direction; determining a range region of the particular information on the pixel value summation distribution diagram according to the size occupied by the particular information in the standard card template image; and mapping a position of the particular information in the pixel value summation distribution diagram to the transformed card image, and extracting the image region containing the particular information from the transformed card image within the range region.

In an embodiment, upon extracting and outputting the image region is extracted as the independent image, an OCR technology is adopted to perform information identification on the outputted image region to acquire a text form of the recorded information.

The present disclosure further provides an apparatus of extracting particular information from a standard card, relevant parameters and shape information of the standard card being determined based on a standard card template image, including: an acquisition unit to acquire a card image of the standard card having the particular information to be extracted; an identification unit to identify an image region containing the particular information in the card image acquired by the acquisition unit; and an output unit to output the image region identified by the identification unit as an independent image.

In an embodiment, the acquisition unit may include: a source image acquisition unit to acquire a source image of the card image of the standard card having the particular information to be extracted; a defining unit to define a region of the card image in the source image acquired by the source image acquisition unit; and an extraction unit to extract image information from the region defined by the defining unit as the card image of the standard card having the particular information to be extracted.

In an embodiment, the defining unit may include: an image element extraction unit to extract image elements which are straight line segments and have a length greater than a preset threshold from the source image; a combination unit to combine the straight line segments extracted by the image element extraction unit and determine combinations of line segments capable of forming a quadrilateral; an intersection point determination unit to extend respective lengths of four line segments in a combination of the combinations of line segments in the combination unit and determine positions of intersection points of the line segments; a first condition selection unit to use the intersection points of the line segments determined by the intersection point determination unit being within a range of the source image as a first condition and select combination(s) of line segments satisfying the condition; a first condition determination unit to determine whether only one combination of line segments that are selected by the first condition selection unit and satisfies the condition exists, and trigger a card image determination unit if affirmative; and the card image determination unit to define a region framed by the combination of line segments as the region of the card image in the source image.

In an embodiment, if a determination result of the first condition judgment unit is negative, a first condition extraction unit is triggered; the first condition extraction unit extracts all combinations of line segments that are selected by the first condition selection unit and satisfy the first condition; a second condition first determination unit screens the combinations of line segments which are extracted by the first condition extraction unit based on a second condition, i.e., determining whether intersection points of line segments in a combination of line segments are on respective extension lines of the line segments, and using the line segments as a candidate combination of line segments if affirmative; and a second condition second determination unit determines whether only one combination of line segments that is acquired by the second condition first determination unit and satisfies the second condition exists, and defines a region framed by the combination of line segments as the region of the card image in the source image if affirmative.

In an embodiment, if a determination result is negative in the determination of whether only one combination of line segments by the second condition second determination unit, the following units are triggered to screen combinations of line segments that satisfy the second condition: an intersection point acquisition unit to acquire intersection points of line segments in a combination of line segments from the second condition second determination unit, the combination of line segments including four intersection points; a computation unit to obtain image coordinates of the four intersection points from the intersection point acquisition unit, obtain a homography matrix based on a correspondence between image coordinates of four points of the standard card template image and the image coordinate of the four intersection points, compute to form two line segments of the intersection points as X and Y axes using the homography matrix and using the intersection points in the four intersection points as original points, compute unit vectors of X' and Y' axes corresponding to the X and Y axes in an image after a homography matrix transformation, and compute an included angle between the unit vectors; and a threshold determination unit to determine whether the included angle for the unit vectors acquired in the combination of line segments is different from ninety degrees by an amount less than a preset threshold, and define a region framed by the combination of line segments as the region of the card image in the source image if affirmative.

In an embodiment, the identification unit may includes: a parameter acquisition unit to acquire relative position parameters which reflect a relative position of the particular information in the standard card according to parameters of a standard card template; a transformation unit to perform a homography matrix transformation based on the card image extracted by the acquisition unit and a shape of the standard card template image to acquire a transformed card image; and a clipping unit to clip an image region in conformity with the relative position parameters in the transformed card image in the transformation unit based on the relative position parameters of the particular information in the standard card template acquired by the parameter acquisition unit, the image region being the image region containing the particular information.

In an embodiment, the identification unit may include: a transformation unit to perform a homography matrix transformation on the card image according to the standard card template image to acquire a transformed card image; a standard card template filtering unit to filter the standard card template to acquire a filtered standard card template image; a standard card template image pixel value summation unit to acquire, according to a recording direction of the particular information to be extracted, a first pixel value summation distribution diagram of the filtered standard card template image from the standard card template filtering unit in the recording direction; a card image filtering unit to filter the transformed card image to acquire a filtered card image; a card image pixel summation unit to perform a pixel value summation computation in the recording direction to acquire a second pixel value summation distribution diagram of the card image in the recording direction based on the filtered card image from the card image filtering unit and the recording direction of the particular information; and a comparison and identification unit to receive and compare the first pixel value summation distribution diagram and the second pixel value summation distribution diagram to find a position having a same pixel value summation feature in the recording direction of the particular information in the first pixel value summation distribution diagram within the second pixel value summation distribution diagram, and identify thereof as the image region containing the particular information in the card image.

In an embodiment, the identification unit may include: a transformation unit to perform a homography matrix transformation on the card image according to a shape of a standard card template image to acquire a transformed card image; a standard card template image particular information determination unit to determine a size occupied by the particular information of the standard card template image in the standard card template image according to parameters of the standard card template image; a filtering unit to filter the card image transformed by the transformation unit to acquire a filtered card image; a card image pixel summation unit to perform a pixel value summation computation in the recording direction on the card image filtered by the filtering unit based on the recording direction of the particular information to acquire a pixel value summation distribution diagram of the card image in the recording direction; a particular information position determination unit to determine a position of the particular information in the pixel summation distribution diagram based on the size occupied by the particular information of the standard card template image in the standard card template image; and a particular information image identification unit to map the position of the particular information in the pixel summation distribution diagram to the transformed card image and extract the image region containing the particular information of the transformed card image from a range region.

In an embodiment, the particular information position determination unit may include: a position range computation unit to multiply the size of the particular information by a range coefficient to compute a position range of the particular information in the pixel value summation distribution diagram; a peak value selection unit to select a peak value of the pixel value summation distribution diagram within the position range; and a range region selection unit to select the range region in the pixel summation distribution diagram based on the size of the particular information with the peak value as a center, and map the range region to the transformed card image.

The present disclosure further provides a method of inputting particular information in a standard card via a mobile terminal, which may include: storing a standard card template in the mobile terminal; and outputting an extracted image region containing particular information to a corresponding interface of the mobile terminal using the foregoing method of extracting the particular information in the standard card.

In an embodiment, the extracted image region containing the particular information is identified using an OCR technology to acquire a text form of recorded information; and the text form is outputted to a preset position of a text input in the mobile terminal.

Compared with existing technologies, the present disclosure has the following characteristics:

The method and the apparatus of extracting particular information from a standard card that are provided by the present disclosure identify an image region containing particular information in a card image, extract and output the image region as an independent image by acquiring the card image of the standard card with the particular information to be extracted, which can acquire a part of the image involving the particular information only from the standard card conveniently, quickly and accurately and thus improve the working efficiency.

The present disclosure further provides a method of inputting particular information in a standard card on a mobile terminal. According to a demand for particular information in a standard card, a part of an image region containing the particular information only in the standard card is outputted and displayed in a corresponding interface of a mobile terminal by using the method of extracting particular information in a standard card. Furthermore, the particular information in the image region is outputted to a text box in the same interface as the image region in a textual form manually or using the OCR technology. As such, a user of the mobile terminal may reference the image region containing the particular information displayed in the interface for checking when verifying character strings in the text box. Specifically, when checking whether the particular information is correct, the user only needs to complete such operation in the same interface of the mobile terminal, which makes inputting particular information of a standard card more conveniently, quickly and accurately. Furthermore, a process of checking is simplified, thus improving user experience.

DESCRIPTION OF THE DRAWINGS

In order to describe technical solutions in the embodiments of the present disclosure or the existing technologies more clearly, drawings that are needed for describing the embodiments or the existing technologies are briefly introduced herein. Apparently, the described drawings are merely some embodiments recorded in the present disclosure. One skilled in the art can also acquire other drawings based on these drawings.

FIGS. 6-13 are specific example diagrams during respective processes of the embodiments of the present disclosure.

DETAILED DESCRIPTION

The technical solutions in the embodiments of the present disclosure will be described clearly and completely herein in conjunction with the drawings in the embodiments of the present disclosure. Apparently, the described embodiments are merely representative of a part of and not all of embodiments of the present disclosure. All other embodiments acquired by one skilled in the art based on the embodiments in the present disclosure shall belong to the protection scope of the present disclosure.

Figure 1:
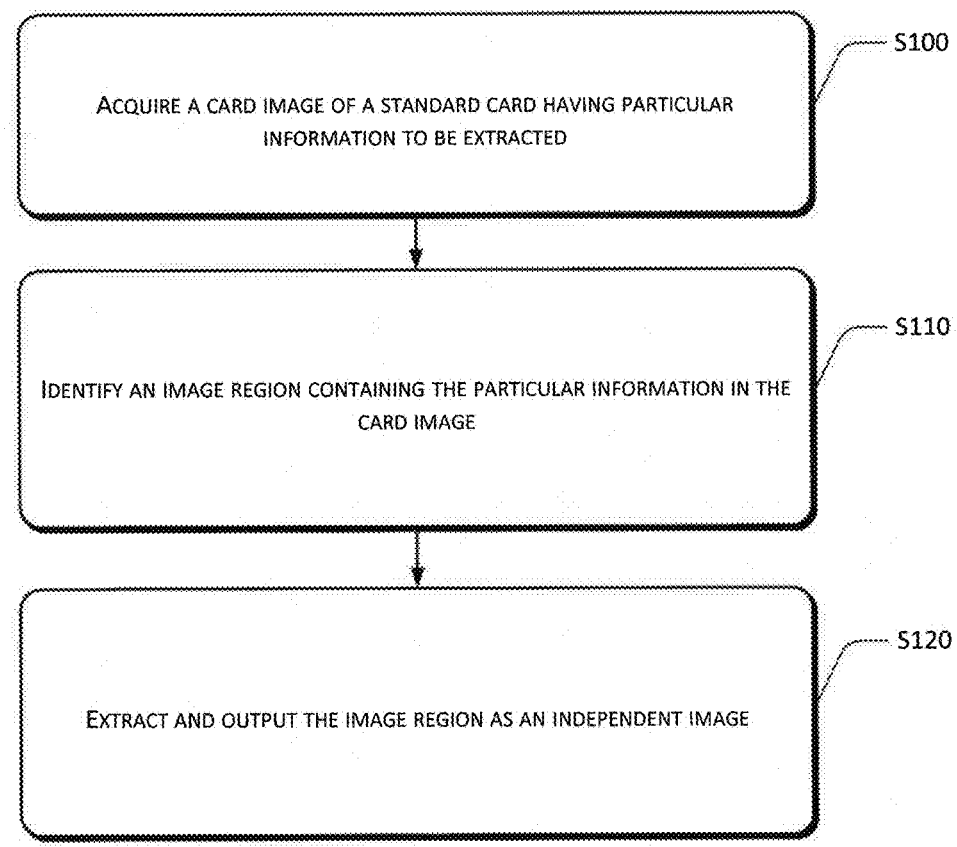
FIG. 1 is a flowchart of a method of extracting particular information from a standard card in accordance with the present disclosure.

Referring to FIG. 1, FIG. 1 shows a flowchart of a method of extracting particular information from a standard card in accordance with the present disclosure.

Specifically, when extracting particular information from a standard card, firstly a card image of the standard card having the particular information to be extracted needs to be acquired at S100. An image region containing the particular information in the acquired card image is identified at S110. The identified image region containing the particular information is extracted and outputted as an independent image at S120. Thus, the image region containing only the particular information is extracted in a quick and accurate manner. Since the image containing the particular information is a meaningful way of presentation of the particular information to a user, an extraction of the image corresponds to an extraction of the particular information in the standard card.

It should be noted that attribute(s) and relevant information of a standard card may be determined through a standard card template. In other words, particular information contained in standard cards may be determined based on different standard card templates. In order to avoid confusion, concepts of a standard card and a standard card template are explained herein. A standard card is referred to as a card with particular information which needs to be identified. A standard card template image is referred to as an image sample model of a standard card, i.e., a card template that specifies a shape and a size of a standard card and records position of various pieces of information.

In order to describe a method of extracting particular information in a standard card provided by the present disclosure in a better manner, exemplary implementations of the above method blocks are described hereinafter. In these exemplary implementations, a bank card is used as the standard card and a bank card number is used as the particular information in this embodiment for illustrating a technical solution of the present disclosure.

Figure 2:
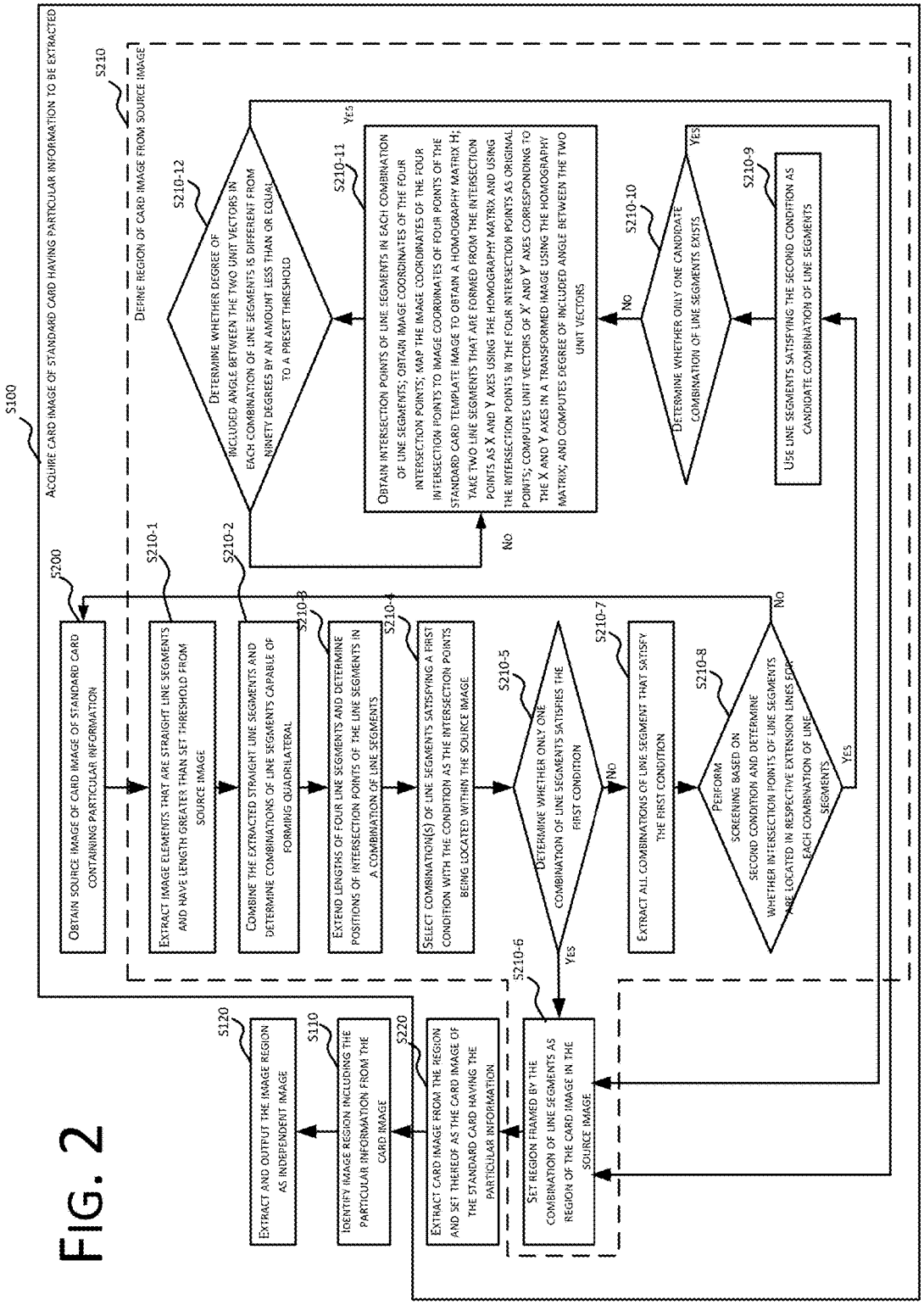
FIG. 2 is a flowchart of acquiring a card image of a standard card having the particular information to be extracted in the method of extracting the particular information from the standard card in accordance with a first embodiment of the present disclosure.

In FIG. 1, the method block S100 of acquiring a card image of a standard card having particular information to be extracted may be implemented through a specific implementation as shown in FIG. 2. FIG. 2 shows a flowchart of a first implementation of acquiring a card image of a standard card having particular information to be extracted in the method of extracting the particular information in the standard card provided by the present disclosure. It should be noted that an implementation of acquiring the card image of the standard card having the particular information to be extracted is not limited to content described below.

Figure 6:

In the process of acquiring the card image of the standard card with the particular information to be extracted according to S100, the process is completed mainly through three method blocks, namely:

S200 obtains a source image of the card image of the standard card containing the particular information to be extracted. In this method block, the source image of the bank card containing the bank card number needs to be acquired. Background of the source image or acquisition environment of the source image is/are not constrained by any condition. The source image may be a bank card image as shown in FIG. 6, for example.

S210 defines a region of the card image in the source image.

A specific process of an implementation of defining the region of the card image in the source image at S210 is as follows:

S210-1 extracts image elements which are straight line segments and have a length greater than a set threshold from the source image.

Figure 7:

In this method block, line segments in a bank card source image containing a bank card number are extracted, and straight line segments in the source image may be detected using a straight line segment detection algorithm such as an LSD (Line Segment Detector) or Hough transformation. In this method block, a relatively large number of line segments appear in a detection for line segments in the source image due to a complex background during an extraction of the source image. For example, a plurality of line segments appear in the detection of the bank card image as shown in FIG. 7. In this regard, a minimum value may be set as a threshold for a length of a line segment to reduce a scope of detection results. For example, a determination result as unsatisfactory is made for a line segment having a length less than thirty pixels in every four line segments.

S210-2 combines the extracted straight line segments and determines combinations of line segments in which straight lines where the line segments are located are capable of forming a quadrilateral.

In this method block, after the line segments are detected and extracted according to S210-1, since the bank card is a quadrilateral, in order to acquire the card image of the bank card, the extracted line segments need to be combined using four as a cardinal number, and only combinations of line segments which can form a quadrilateral are selected, thus excluding combinations of line segments which cannot form a quadrilateral.

S210-3 determines positions of intersection points of respective straight lines where the line segments are located for the combinations of line segments which are capable of forming a quadrilateral.

S210-4 uses the intersection points of the respective straight lines where the line segments are located being within a range of the source image as a first condition, and selects combination(s) of line segments satisfying the condition.

A plurality of quadrilateral combinations may exist in the source image. Since the position of the bank card in the source image is demanded to be located at the middle part of the image for sure, i.e., an image part of the bank card in the source image is complete, intersection points of a quadrilateral formed by four sides of the bank card are certainly within the source image and cannot be outside the source image. Due to the above reasons, the combinations of line segments which intersection points are outside the source image can be excluded. As this condition is the most fundamental and can be easily determined, this is used as the first condition. Since the source image selected by a user generally has a card placed in a relatively simple background, only one combination of line segments may be acquired in this method block in most cases.

S210-5 determines whether only one combination of line segments satisfies the first condition, goes to S210-6 if affirmative, and goes to S210-7 if not.

It should be noted that, if no line segment that satisfies the first condition exists during the determination process at S210-5, S200 is returned to re-acquire a source image of the card image of the standard card containing the particular information to be extracted and a determination is made again (this method block is not shown in FIG. 2).

S210-6 defines a region framed by the combination of line segments as the region of the card image in the source image. The method block S210 is ended here.

S210-7 extracts all combinations of line segments that satisfy the first condition.

S210-8 selects combination(s) of line segments satisfying the first condition based on a second condition as follows: determining whether intersection points of line segments are on respective extension lines of the line segments in each combination of line segments; using the combination of line segments as a candidate combination of line segments if affirmative; selects all combination(s) of line segments satisfying the second condition according to this criterion; and goes to S210-9.

In this method block, a determination is made again for all combinations of line segments that satisfy the condition that the intersection points of the line segments are within the range of the source image at S200-8, to determine whether the intersection points are on respective extension lines of the line segments. According to "Rules for Card BIN Numbers and Indicators", in Volume 3 of Regulations on Business Operation of UnionPay, it can be understood and known that four rounded corners are arranged according to a specification of external appearance of bank cards. Accordingly, intersection points of straight line segments of four sides of a bank card are certainly located on extension lines of the line segments and cannot be located within the line segments. Thus, this condition is used as a second condition.

It should be noted that, in the process of selecting combination(s) of line segments that satisfy the first condition based on the second condition, if the intersection points of the line segments are not located on the extension lines of the line segments, S200 is returned to re-acquire a source image of the card image of the standard card containing the particular information to be extracted.

S210-9 uses the line segments that satisfy the second condition as candidate combination(s) of line segments.

S210-10 determines whether only one candidate combination of line segments exists, goes to S210-6 if affirmative, and goes to S210-11 if not.

S210-11 obtains intersection points of line segments in each combination of line segments, each combination of line segments including four intersection points; obtains image coordinates of the four intersection points; maps the image coordinates of the four intersection points to image coordinates of four points of the standard card template image to obtain a homography matrix H; takes two line segments that are formed from the intersection points as X and Y axes using the homography matrix and using the intersection points in the four intersection points as original points; computes unit vectors of X' and Y' axes corresponding to the X and Y axes in a transformed image using the homography matrix; and computes a degree of an included angle between the two unit vectors.

In this method block, four intersection points of line segments in each combination of line segments are acquired, and image coordinates of the four intersection points are obtained. A homography matrix H is acquired according to a correspondence between coordinates of four points of a standard card template image and the image coordinates. The standard card template image is a standard image of the bank card, coordinates of four points of the bank card is (0, 0), (0, 85), (54, 85), (54, 0), and 85/54 is a length-width ratio of the standard bank card. A transformation computation is performed based on the acquired homography matrix, i.e., using any one intersection point of the four intersection points as an origin with corresponding two line segments that form the intersection point as X and Y axes. Unit vectors of X' and Y' axes corresponding to the X and Y axes in the image after the homography matrix transformation are computed, and further a degree of an included angle between two unit vectors is computed. Thereafter, S210-12 is performed.

S210-12 determines whether the degree of the included angle between two unit vectors acquired in S210-11 in each combination of line segments is different from ninety degrees by an amount less than or equal to a preset threshold.

In this method block, assuming that a combination of line segments corresponds to four sides of the bank card, an included angle between two unit vectors will be equal to ninety degrees. Therefore, when determining whether a combination of line segments corresponds to four sides of the bank side, a threshold range may be set such that when a difference between the degree of the included angle and ninety degrees is less than or equal to five degrees, S210-6 will be performed to define a region framed by the combination of line segments as the card image of the standard card having the particular information to be extracted. Otherwise, S210-11 will be performed to acquire a new combination of line segments and compute a degree of an included angle for this combination of line segments.

Similarly, no difference value which is less than or equal to the preset threshold exists for the combinations of line segments, S200 may be returned to acquire a new source image of the card image of the standard card having the particular information to be extracted (this method block is not shown in FIG. 2).

Figure 8:

Upon determining the region of the bank card image at S210-6 (as shown in FIG. 8), S220 is performed.

At S220, a card image which is taken as the card image of the standard card having the particular information to be extracted is extracted from the region.

At this method block, the bank card image is extracted from the determined region of the source image to form a card image having an image of the bank card only, and the card number on the bank card is the particular information of the bank card.

After the card image of the bank card is extracted, the image region containing the particular information in the card image needs to be identified, i.e., S110.

S110 is to identify the image region containing the particular information in the card image.

Figure 3:
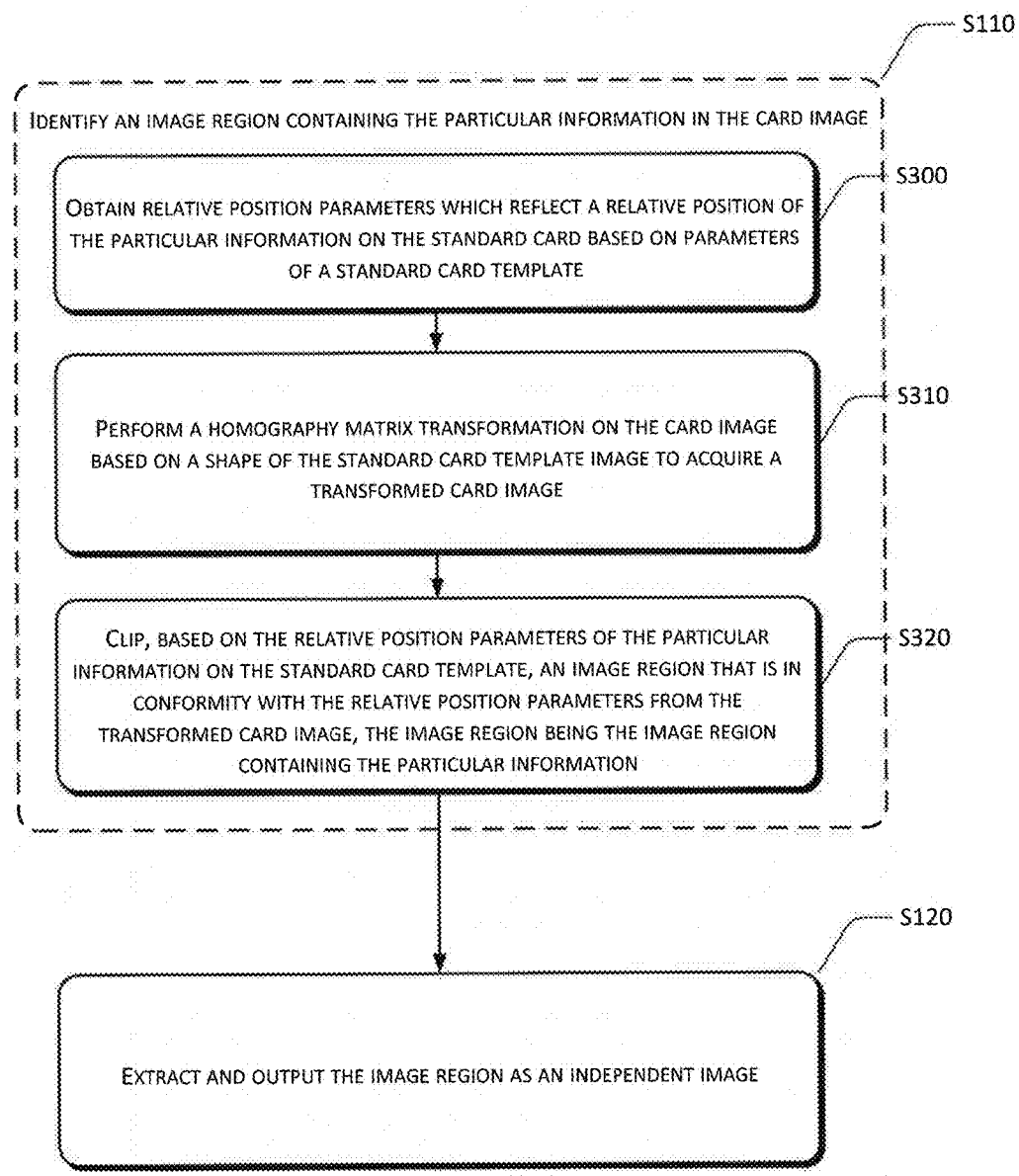
FIG. 3 is a flowchart of identifying an image region containing the particular information in the method of extracting the particular information from the standard card in accordance with the first embodiment of the present disclosure.
Figure 4:
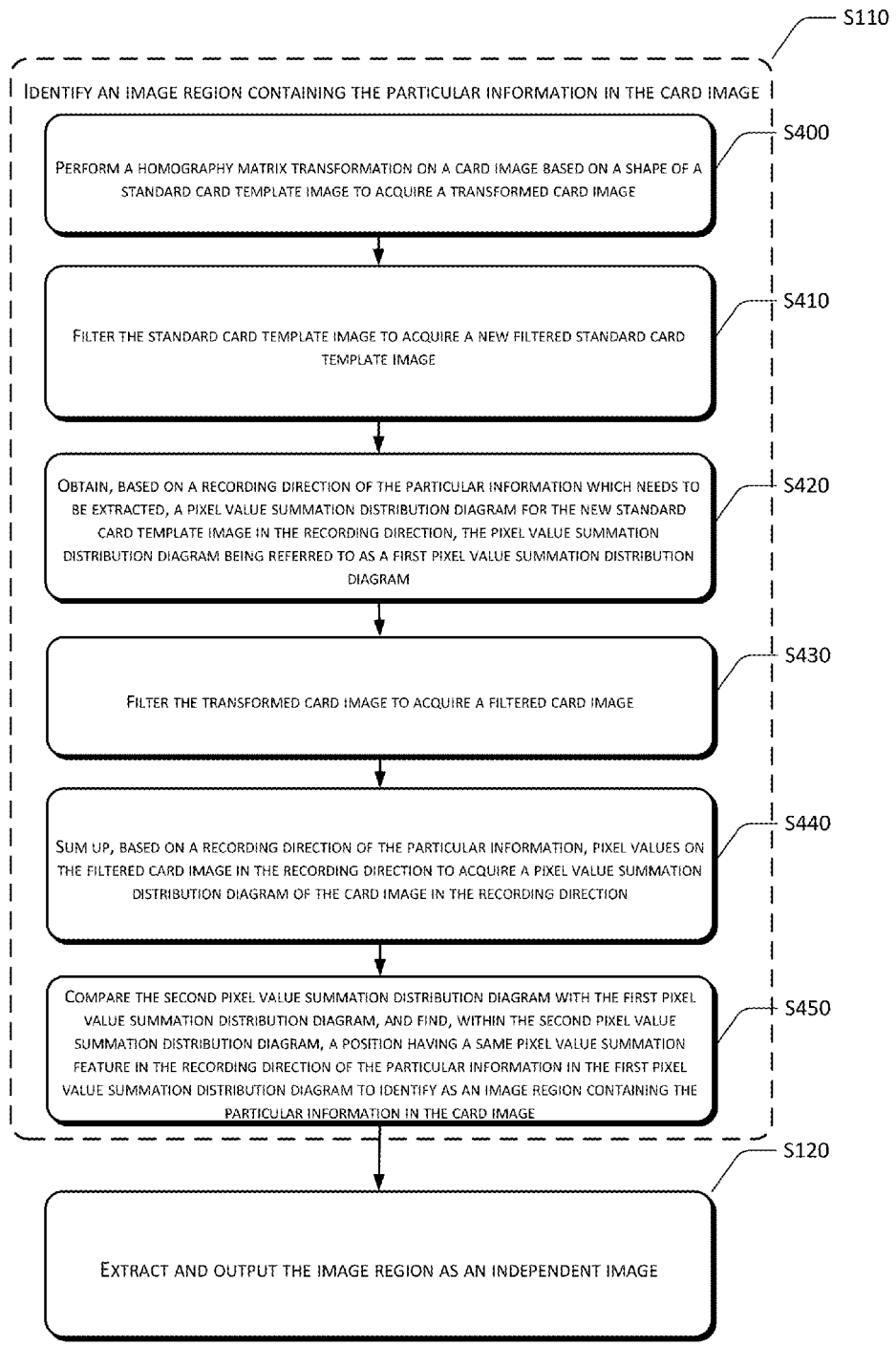
FIG. 4 is a flowchart of identifying an image region containing the particular information in the method of extracting the particular information from the standard card in accordance with a second embodiment of the present disclosure.

Specific implementations of the method block S110 may be referenced to FIG. 3 and FIG. 4. FIG. 3 shows a flowchart of a first implementation of identifying an image region containing particular information in a card image in the method of extracting the particular information in the standard card in accordance with the present disclosure. FIG. 4 shows a flowchart of a second implementation of identifying an image region containing particular information in a card image in the method of extracting the particular information in the standard card in accordance with the present disclosure. FIG. 3 and FIG. 4 are described in detail hereinafter.

After an image of a bank card is extracted from a source image and is used as a card image of a standard card having particular information to be extracted, an image region containing a bank card number in the card image needs to be identified. Details of such process are shown in FIG. 3.

S300 obtains relative position parameters which reflect a relative position of the particular information on the standard card based on parameters of a standard card template.

When the standard card is a bank card, the parameters of the standard card template are parameters of a bank card template. According to relevant labeling rules of bank cards, the parameters of the template may be acquired, i.e., the bank card number is embossed in a card number identification region (a single line) of an embossing/printing region, and the card number identification region can contain at most nineteen embossed characters. The bank card number is embossed at a position with a line across centers of the characters being separated from the bottom edge of the card by a distance of 21.42 mm. The distance between a centerline of an initial character of the card number and the left edge of the card is 10.18 mm. Based on the parameters of the template, the position parameters of the relative position of the particular information (i.e., the bank card number) on the standard card may be acquired, and S310 will be performed.

S310 performs a homography matrix transformation on the card image based on a shape of the standard card template image to acquire a transformed card image.

Figure 9:
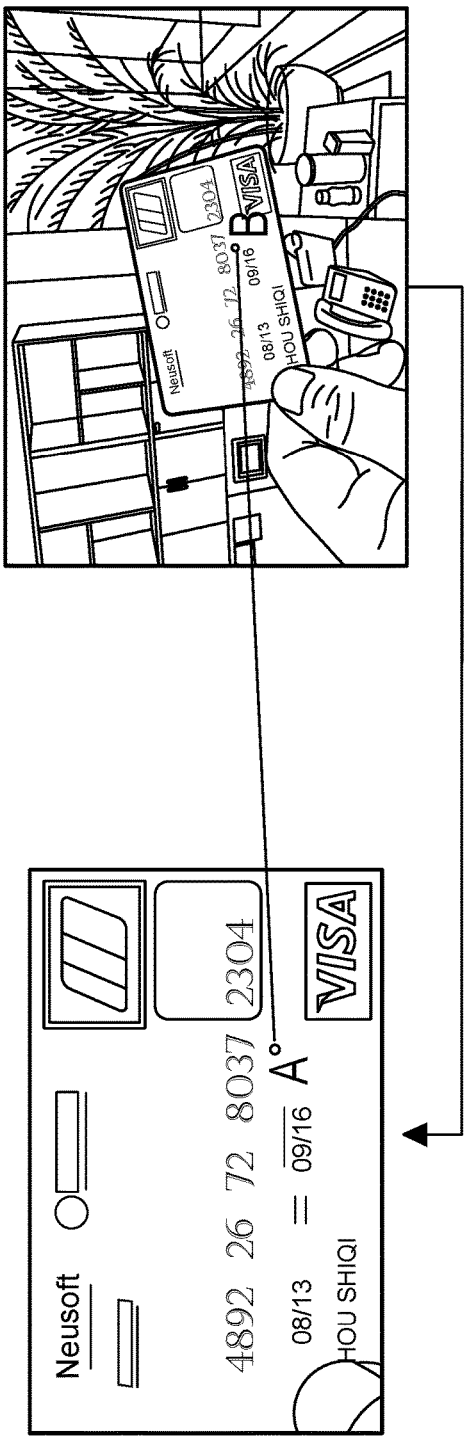

As shown in FIG. 9, at this method block, a position coordinate of an arbitrary pixel A in the standard card image is assumed to be $(x_A, y_A)$. Using the homography matrix H obtained from the card image and the standard card template image, a position coordinate $(x_B, y_B)$ of a point B in the card image that corresponds to the assumed point A in the standard card image is computed through a formula $$H\begin{pmatrix} x_A \\ y_A \end{pmatrix} = \begin{pmatrix} x_B \\ y_B \end{pmatrix}.$$

A pixel value of the point B is then assigned to the point A, and this operation is performed on all pixel points in the card image accordingly to obtain a transformed card image. It should be noted that the homography matrix H at this method block may be obtained based on a correspondence between intersection points of four sides of the card image and four intersection points in the standard card template image, such as using the approach used at S210-11.

It can be understood that the above is merely an approach used for transforming the card image based on the standard card template image, and an actual transformation approach is not limited thereto.

Step S320 clips, based on the relative position parameters of the particular information on the standard card template, an image region that is in conformity with the relative position parameters from the transformed card image, the image region being the image region containing the particular information.

At this block, in an event that the particular information is bank card number information, a position of the card number on the bank card may be acquired according to S300 and an image region of the card number in the bank card image may be acquired by comparing the standard bank card with the transformed bank card acquired according to S310. Thereafter, S120 will be performed to extract and output the image region as an independent image.

Upon determining the image region containing the bank card number, and upon extracting and outputting the card number image region as the independent image at S120, an OCR technology may be applied to perform information identification on the card number image that is outputted, and display the card number in a textual form. Alternatively, the text record information of the card number may be displayed via manual input with reference to the outputted card number image.

The present disclosure may also employ an approach as shown in FIG. 4 as an implementation process for S110. The approach as shown in FIG. 4 is particularly applicable when the particular information of the standard card is embossed on the card. The approach includes:

S400 performs a homography matrix transformation on a card image based on a shape of a standard card template image to acquire a transformed card image.

The details of the transformation process of this method block may be referenced to the approach of S310. A size of the card image after the homography matrix transformation is consistent with that of the standard card template image.

S410 filters the standard card template image to acquire a new filtered standard card template image.

At this method block, the standard card template image is filtered to acquire a new filtered bank card template image. In the new bank card template image, information at each position on the surface of the bank card may be acquired through a curve after filtering.

S420 obtains, based on a recording direction of the particular information which needs to be extracted, a pixel value summation distribution diagram for the new standard card template image in the recording direction, the pixel value summation distribution diagram being referred to as a first pixel value summation distribution diagram.

At this method block, a pixel value summation distribution diagram for the bank card template image in a recording direction of card number at a later stage of filtering may be computed based on the recording direction of card number of the bank card. The recording direction is a spatial direction in conformity with an order for reading recorded information. For example, a recording direction of a common bank card is a direction in parallel with a long side.

S430 filters the transformed card image to acquire a filtered card image.

At this block, the extracted image that includes only the bank card is filtered to acquire a filtered bank card image, and S440 is then performed. The purpose of filtering is to make the difference between concave and convex pixels more prominent.

S440 sums up, based on a recording direction of the particular information, pixel values on the filtered card image in the recording direction to acquire a pixel value summation distribution diagram of the card image in the recording direction. The pixel value summation distribution diagram is referred to as a second pixel value summation distribution diagram.

At this method block, summation of pixel values is performed on the filtered bank card image based on the recording direction of the card number to acquire a pixel value summation distribution diagram of the bank card image in the recording direction of the card number. S450 is then performed.

S450 compares the second pixel value summation distribution diagram with the first pixel value summation distribution diagram, and finds, within the second pixel value summation distribution diagram, a position having a same pixel value summation feature in the recording direction of the particular information in the first pixel value summation distribution diagram to identify as an image region containing the particular information in the card image.

At this method block, the pixel value summation distribution diagram of the filtered bank card image may be compared with the pixel value summation distribution diagram of the new filtered standard card template image, and a position having a same feature is a position where the particular information is recorded. Generally, the position of the card number of the bank card is a position where the most information is recorded in a vertical direction of the card, and therefore corresponds to a peak position after the pixel value summation.

Figure 10:
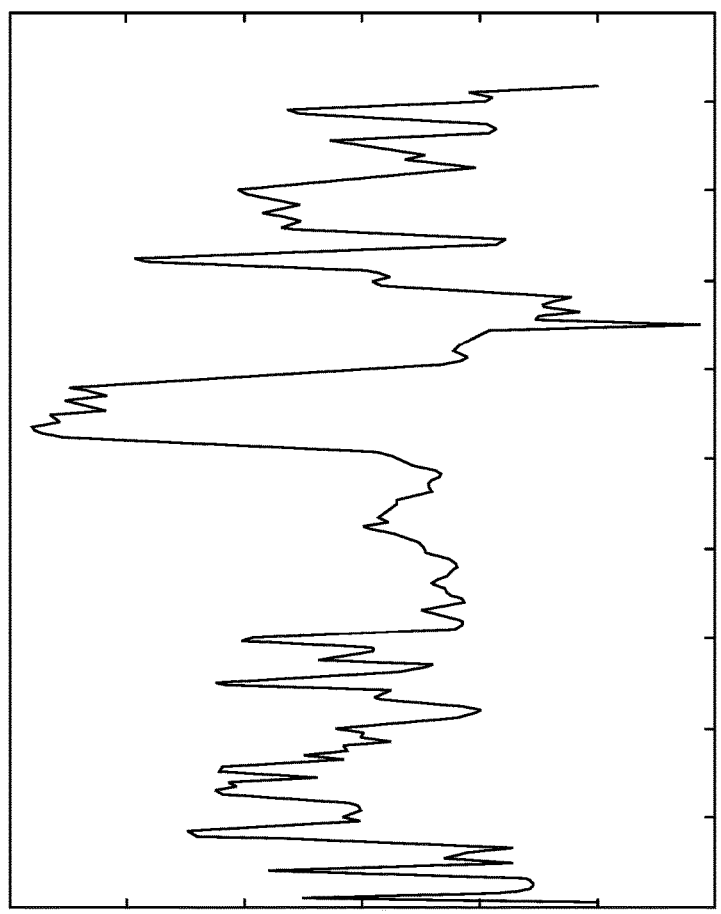

FIG. 10 shows a pixel value summation distribution diagram which horizontal axis represents a distance from one end to the other end in a direction of a width of a standard card, and which vertical axis represents a pixel value summation of each point along a vertical direction (i.e., the recording direction) in the direction of the width of the standard card.

According to this figure, if the particular information which needs to be acquired is the bank card number, the position thereof is at the peak position in the pixel value summation distribution diagram. The horizontal axis corresponding to the peak position may be found, and this position is the position of the bank card number recorded in the standard card (as shown in FIG. 10, where the horizontal axis is the width of the bank card image and the vertical axis is the pixel value summation in the width direction of the bank card image).

Apparently, if what needs to be acquired is the expiration date of the bank card, the position of this information is not the peak position of the pixel value summation distribution diagram. However, according to the standard card template, a position of a similar pixel value sum may be found. For example, the second peak position in FIG. 10 is the position where the expiration date is recorded.

Figure 11:
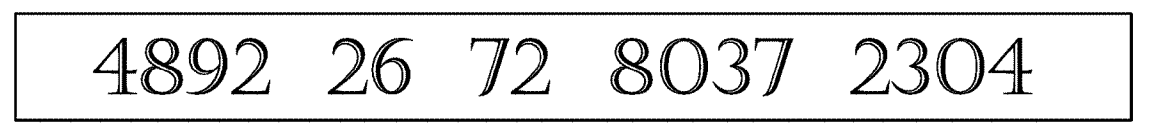

After the image region (as shown in FIG. 11) containing the particular information in the card image is found, S120 is performed.

In the foregoing embodiment of identifying an image region associated with particular information, it can be understood that, on one hand, an error in position parameters may exist when the card number information on the card image is compared with the card number information on the standard bank card template image because the extracted card image of the bank card may be very similar to the standard bank card template image, thus affecting the accuracy of identification. On the other hand, since the positions of card number information of different bank cards may be different slightly, the accuracy of identification may also be affected.

Figure 5:
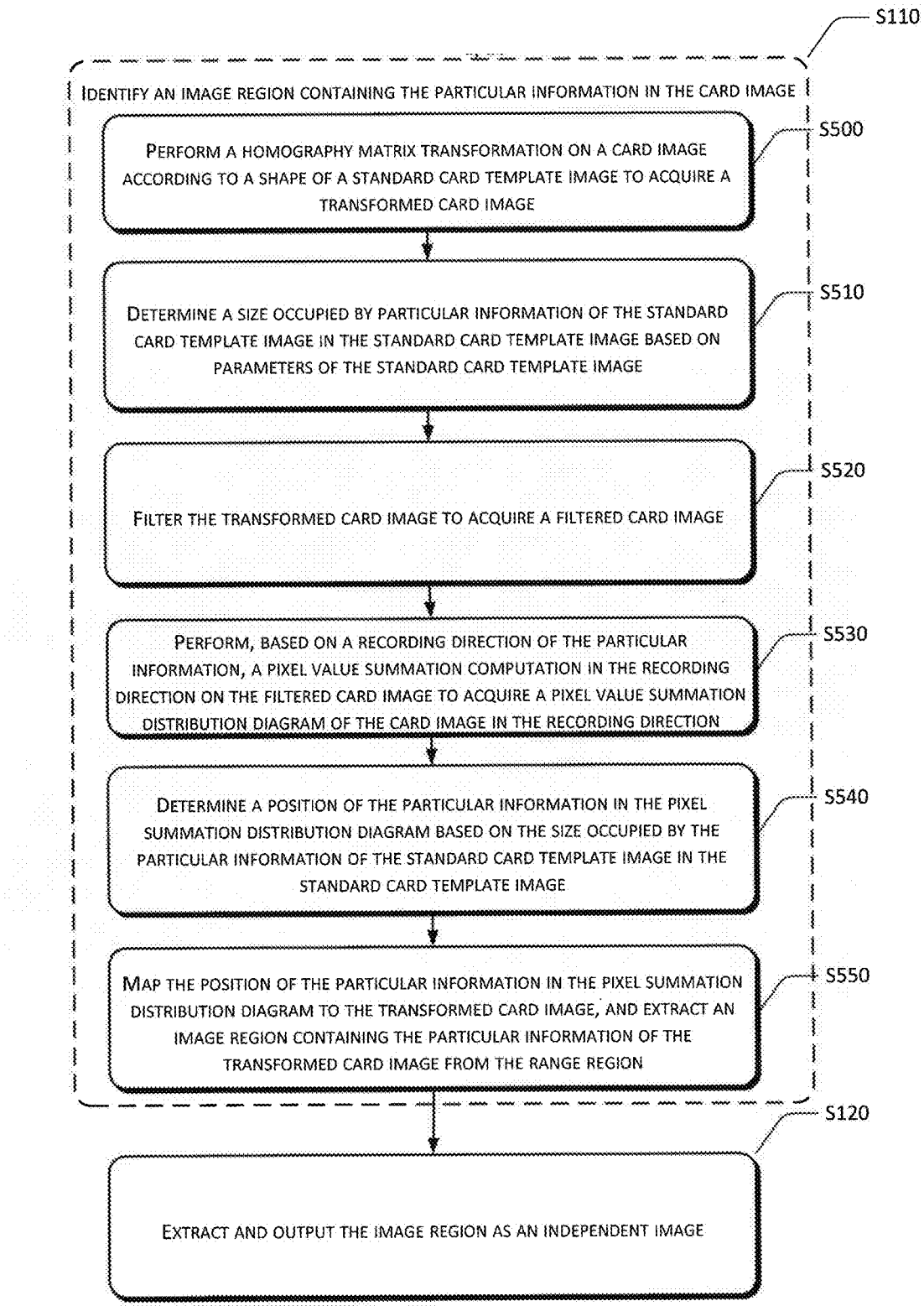
FIG. 5 is a flowchart of identifying an image region containing the particular information in the method of extracting the particular information from the standard card in accordance with a third embodiment of the present disclosure.

Based on the above two implementations, the present disclosure provides a third implementation of identifying an image region associated with particular information. Referring to FIG. 5, details thereof include:

Step S500 performs a homography matrix transformation on a card image according to a shape of a standard card template image to acquire a transformed card image.

Details of the transformation process of this method block may be referenced to the approach at S310. A size of the card image after the homography matrix transformation is consistent with that of the standard card template image.

S510 determines a size occupied by particular information of the standard card template image in the standard card template image based on parameters of the standard card template image.

At this method block, position parameters of a card number on a standard bank card may be determined according to an official standard on of bank card production. For example, the bank card number needs to be embossed in a card number identification region (a single line) of an embossing/printing region and the card number identification region may contain at most nineteen embossed characters. The bank card number needs to be embossed at a position having a distance of 21.42 mm between a character centerline and the bottom edge of the card. The distance between a centerline of an initial character of the card number and the left edge of the card is 10.18 mm. Through the above standard, the size occupied by the card number information on the standard bank card template may be determined, with an assumption that the occupied size is "size".

S520 filters the transformed card image to acquire a filtered card image.

This method block can be referenced to S110-4 in the second implementation.

S530 performs, based on a recording direction of the particular information, a pixel value summation computation in the recording direction on the filtered card image to acquire a pixel value summation distribution diagram of the card image in the recording direction.

This method block can be referenced to S440 in the second implementation.

S540 determines a position of the particular information in the pixel summation distribution diagram based on the size occupied by the particular information of the standard card template image in the standard card template image.

This position is the peak position in the pixel value summation distribution diagram. It should be noted that the peak described herein is actually a range value, i.e., a range region of the card number in the pixel summation distribution diagram.

Since the dimension specification of the acquired card image may be inconsistent with that of the standard card template image, a position range of the card number in the pixel summation distribution diagram may be computed by multiplying the size of the card number in the standard bank card template image by a range coefficient. A peak value is selected within the position range in the pixel summation distribution diagram. A range region in the pixel summation distribution diagram with the peak value as a center is selected based on the size of the card number, and then the range region is mapped to the transformed card image.

The range coefficient may be five times of the size of the card number.

S550 maps the position of the particular information in the pixel summation distribution diagram to the transformed card image, and extracts an image region containing the particular information of the transformed card image from the range region.

In the third implementation, a problem of failing to accurately select particular information due to a discrepancy between dimensions of a transformed card image and a standard card template image can be avoided through setting a range coefficient.

It can be understood that the foregoing implementation extracts an image of particular information from an acquired card image based on a size of the particular information (such as a card number) and a position of the particular information in a standard card template. When a difference exists in positions of particular information due to different issuing banks, a determined size of the particular information can be confined to a certain range according to the foregoing implementation, and a position of the particular information can be determined based on the range to avoid creation of standard card template images for a plurality of cards, thus reducing a comparison space and further reducing an error rate.

It should be noted that an image region containing a card number may also be acquired using the above method when the method of printing the card number is not embossment. Although the present disclosure provides a description only in with respect to embossment specified in relevant bank card mark rules, the present disclosure is also applicable to standard cards (such as a medical insurance card, a membership card and a non-embossed bank card) with particular information which is not embossed because pixels of particular information are different from pixels of background, and a pixel value sum thereof still has a prominent difference from other parts and can be distinguished from the other parts. Therefore, an image region containing the particular information can still be acquired using the above method.

S120 extracts and outputs the image region as an independent image.

After the image region containing the particular information is acquired from the card image, this region may be clipped as the independent image and provided at a position at which the particular information is desired.

A method of inputting particular information in a standard card on a mobile terminal provided by the present disclosure adopts the method of obtaining the particular information from the standard card. Therefore, the mobile terminal needs to store standard card template(s), and then uses the method of extracting the particular information contained in the standard card. A brief description is provided in conjunction with exemplary use scenarios.

Figure 12:
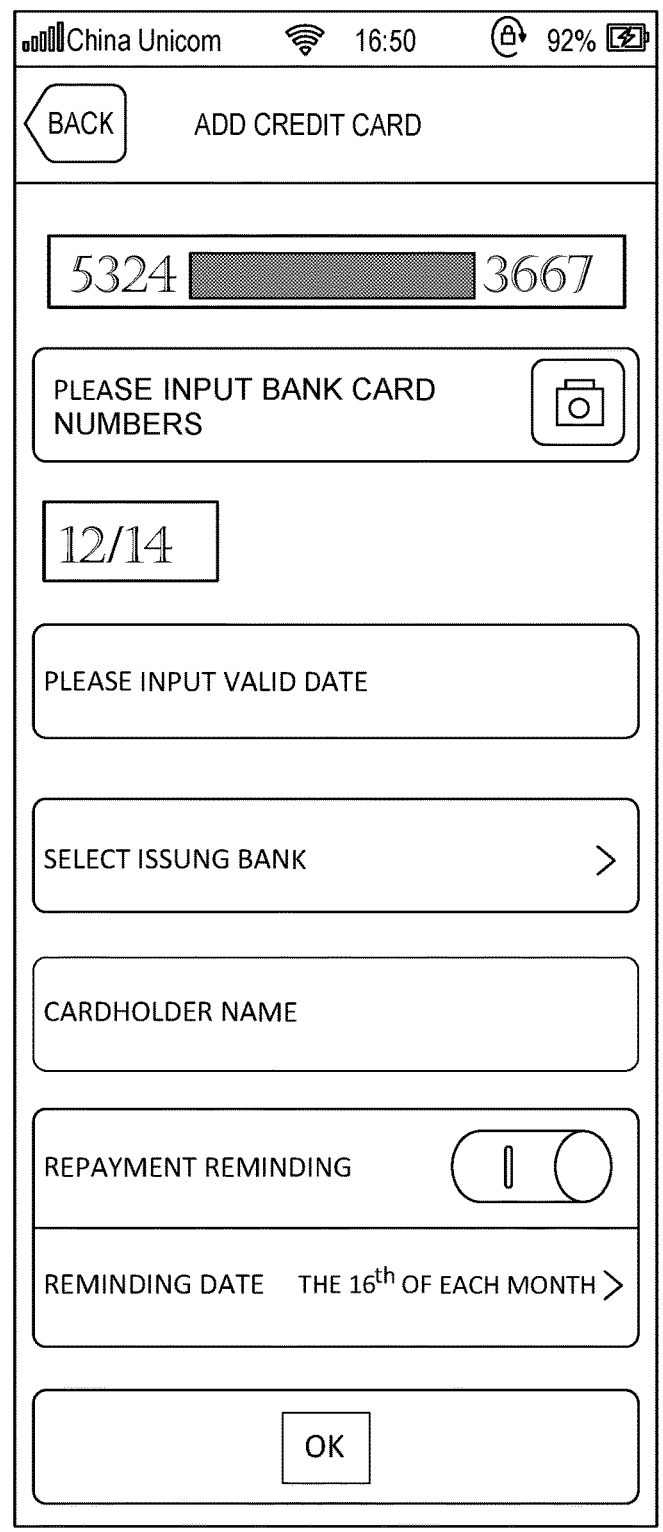

For example, a clipped image region containing a bank card number is extracted and outputted at a position above an input box (in which the bank card number need to be filled) of a touch screen of a mobile terminal. As such, a user may read the bank card number from the image and input the bank card number in the input box directly (as shown in FIG. 12).

Figure 13:
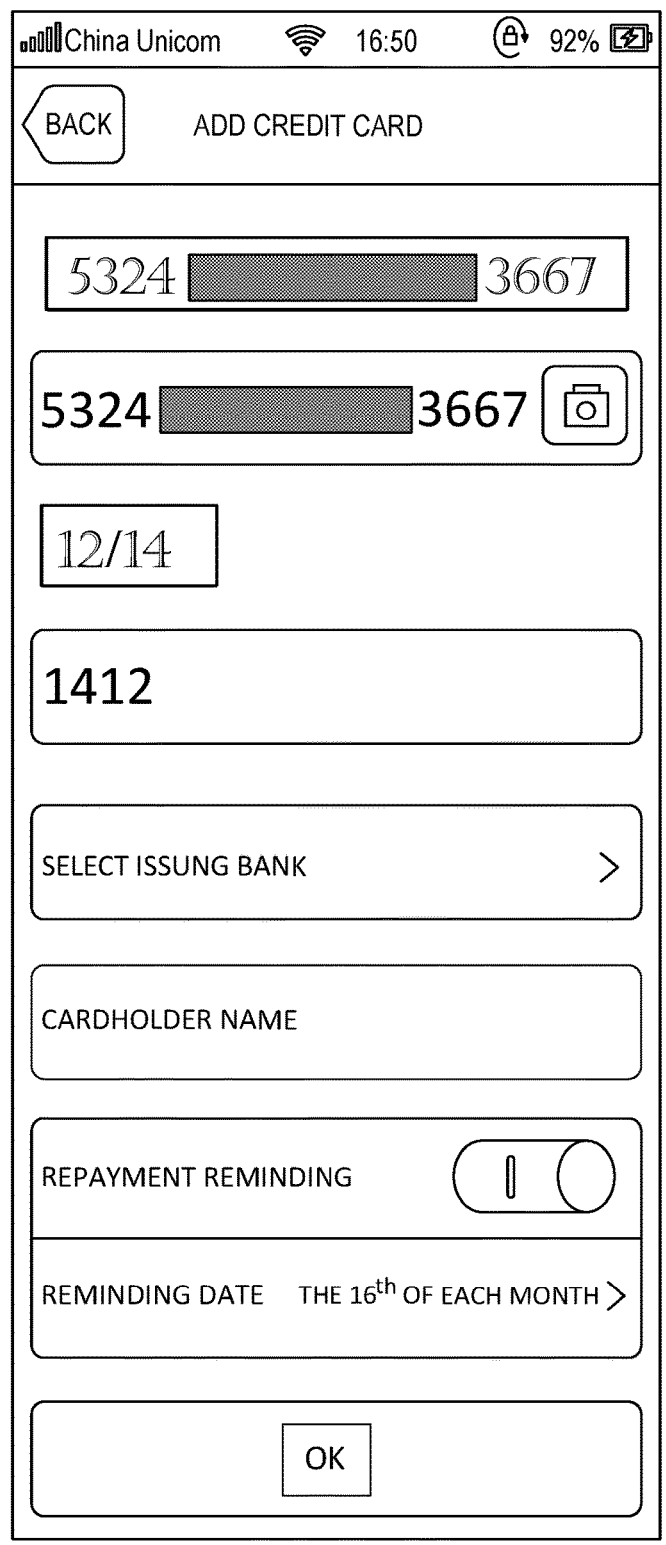

In order to facilitate inputting in a mobile terminal, an OCR technology may be adopted to perform information identification for an outputted image of a card number and display the card number in a textual form on top of this method block. In this scheme, an image region containing the bank card number displayed above an input box of a touch screen of the mobile terminal is only used for checking an identification result of the OCR. A user may correct an incorrect identification result of the OCR visually and manually (as shown in FIG. 13).

It should be noted that the position as characterized above may be determined based on particular information which is actually needed to be extracted. The card number as the particular information is merely used for illustrating the technical solutions of the present disclosure.

In short, the present disclosure identifies, by acquiring a card image of a standard card having particular information to be extracted, an image region containing the particular information in the card image, and then extracts and outputs the image region as an independent image, which thus can acquire an image related to a portion associated with the particular information only in the standard card conveniently, quickly and accurately, and improve the working efficiency.

Figure 14:
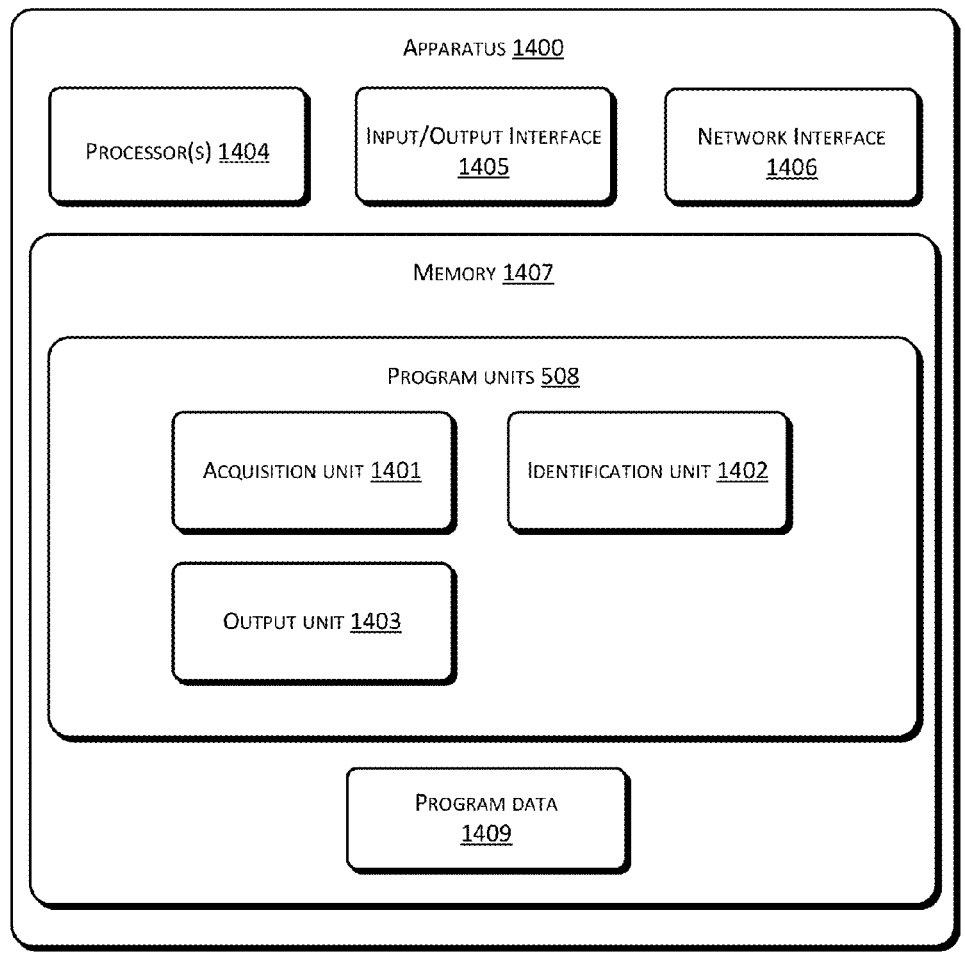
FIG. 14 is a structural diagram of an apparatus of extracting particular information from a standard card in accordance with the present disclosure.

Example methods of extracting particular information in a standard card provided by the present disclosure have been disclosed above. Corresponding to the example methods, the present disclosure further discloses an example apparatus of extracting particular information in a standard card. FIG. 14 shows a structural diagram of an apparatus 500 of extracting particular information in a standard card in accordance with the present disclosure. Since the apparatus embodiment is substantially similar to the method embodiment, a description thereof is relatively simple. Related parts may be referenced to the description of corresponding parts of the method embodiment. The apparatus embodiment described herein is merely illustrative.

The apparatus 1400 includes:
an acquisition unit 1401 to acquire a card image of a standard card containing a particular information to be extracted;
an identification unit 1402 to identify an image region containing the particular information in the card image acquired by the acquisition unit 501; and
an output unit 1403 to output the image region identified by the identification unit 502 as an independent image.

Additionally, in an embodiment, the apparatus 1400 may includes one or more computing devices. For example, the apparatus 1400 may include one or more processors 1404, an input/output interface 1405, a network interface 1406, and memory 1407.

The memory 1407 may be a form of computer readable media, e.g., a non-permanent storage device, random-access memory (RAM) and/or a nonvolatile internal storage, such as read-only memory (ROM) or flash RAM. The memory 1407 is an example of computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an embodiment, the memory 1407 may include program units 1408 and program data 1409. The program units 1408 may include one or more units as described in the foregoing embodiments. For example, the program units 1408 may include the acquisition unit 1401, the identification unit 1402 and/or the output unit 1403.

Figure 15:
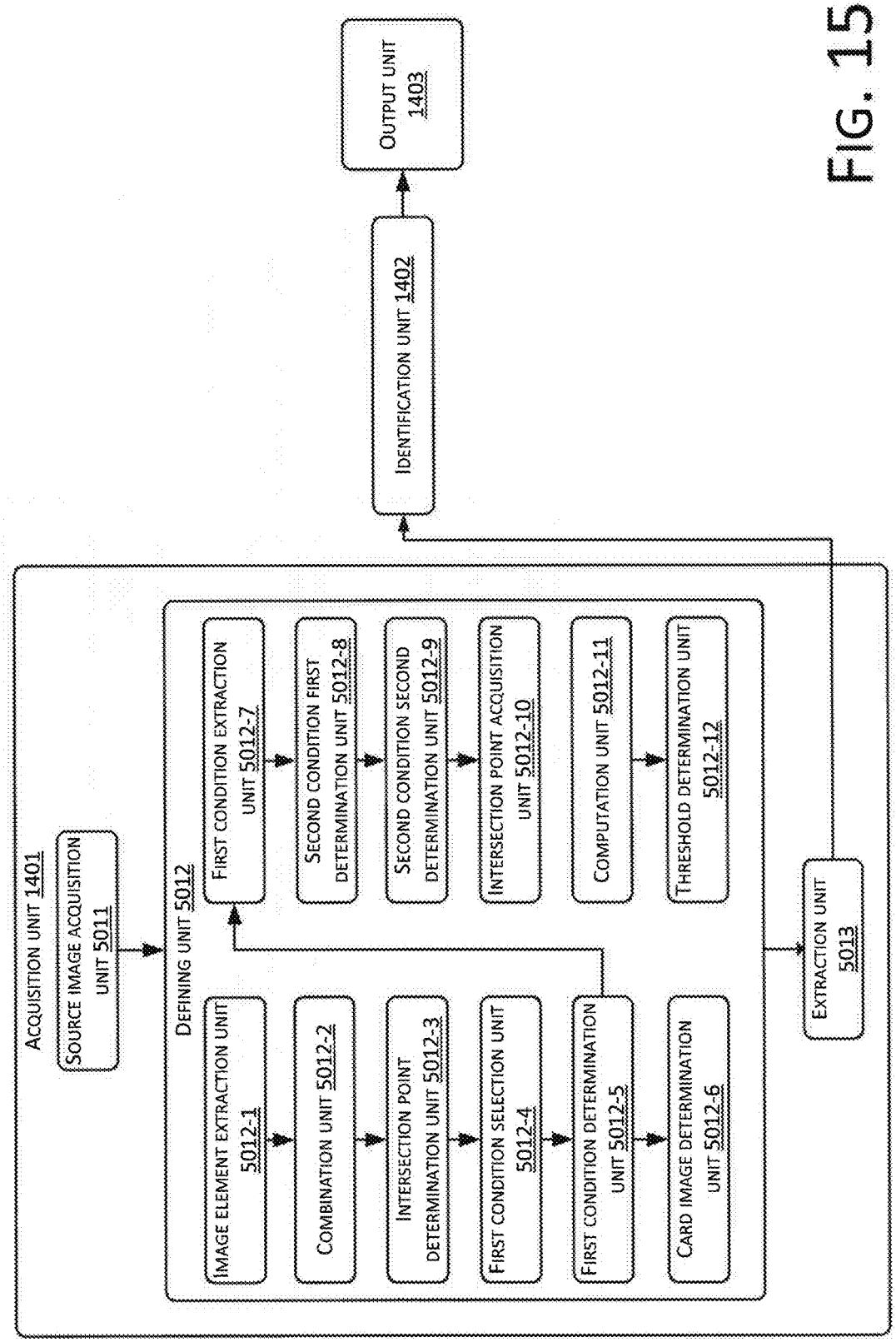
FIG. 15 is a structural diagram of an acquisition unit in the apparatus of extracting the particular information from the standard card in accordance with a first embodiment of the present disclosure.

In order to further describe a process implemented by the acquisition unit 1401, FIG. 15 may be referenced. FIG. 15 is a structural block diagram of a first implementation of the acquisition unit in the apparatus of extracting the particular information in the standard card provided by the present disclosure.

The acquisition unit 1401 includes:
a source image acquisition unit 5011 to acquire a source image of the card image of the standard card containing the particular information to be extracted;
a defining unit 5012 to define a region of the card image in the source image acquired by the source image acquisition unit 5011; and
an extraction unit 5013 to extract image information in the region defined by the defining unit 5012 as the card image of the standard card containing the particular information to be extracted.

The defining unit 5012 includes:
an image element extraction unit 5012-1 to extract image elements which are straight line segments and have a length greater than a preset threshold from the source image.
a combination unit 5012-2 to combine the straight line segments extracted by the image element extraction unit 5012-1 and determine combinations of line segments which are capable of forming a quadrilateral.
an intersection point determination unit 5012-3 to determine positions of intersection points of straight lines where the line segments are located for the combinations of line segments in the combination unit 5012-2.
a first condition selection unit 5012-4 to use the intersection points of the line segments determined by the intersection point determination unit 5012-3 being within a range of the source image as a first condition and select combination(s) of line segments satisfying the condition.
a first condition determination unit 5012-5 to determine whether only one combination of line segments selected by the first condition selection unit 5012-4 satisfies the condition, and trigger a card image determination unit 5012-6 if affirmative.

If a determination result of the first condition determination unit 5012-5 is negative, a first condition extraction unit 5012-7 is started.

The first condition extraction unit 5012-7 extracts all combinations of line segments that satisfy the first condition from the first condition selection unit 5012-4;
a second condition first determination unit 5012-8 to screen the combinations of line segments extracted from the first condition extraction unit 5012-7 according to a second condition: determining whether intersection points of line segments are on respective extension lines of the line segments in a combination of line segments, and using the line segments as a candidate combination of line segments if affirmative;

a second condition second determination unit 5012-9 to determine whether only one combination of line segments acquired by the second condition first judgment unit 5012-7 satisfies the second condition, and define a region framed by the combination of line segments as the region of the card image in the source image if affirmative.

The card image determination unit 5012-6 defines a region framed by the combination of line segments as the card image of the standard card containing the particular information to be extracted.

If a determination result by the second condition second determination unit 5012-9 is negative in the determination of whether only one combination of line segments exists, combinations of line segments that satisfy the second condition are screened by:
an intersection point acquisition unit 5012-10 to acquire intersection points of line segments in a combination of line segments in the second condition second judgment unit 5012-9, the combination of line segments including four intersection points;
a computation unit 5012-11 to obtain image coordinates of the four intersection points acquired by the intersection point acquisition unit 5012-10, map image coordinates of four points of the standard card template image to the image coordinates of the four intersection points to obtain a homography matrix, compute X and Y axes formed by two line segments of an intersection point using each intersection point in the four intersection points as an original point based on the homography matrix, compute unit vectors of X' and Y' axes in an image after a homography matrix transformation corresponding to the X and Y axes, and compute an included angle between the two unit vectors; and
a threshold determination unit 5012-12 to determine whether the acquired included angle between the two unit vectors in a combination of line segments is different from ninety degrees by an amount less than a preset threshold; and define a region framed by the combination of line segments as the card image of the standard card containing the particular information to be extracted if affirmative.

Figure 16:
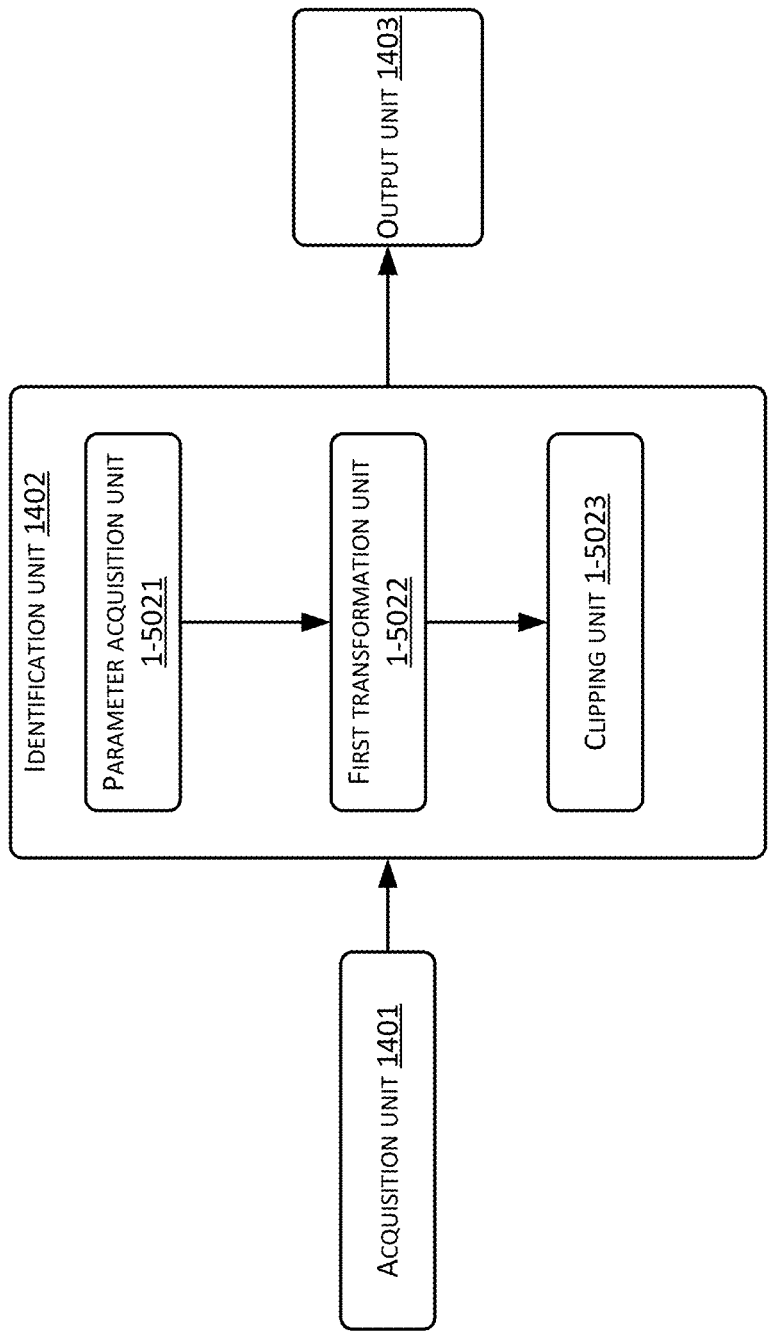
FIG. 16 is a structural block diagram of the first embodiment of the identification unit in the apparatus of extracting the particular information in the standard card in accordance with the first embodiment of the present disclosure.

The identification unit 1402 is used for identifying the image region containing the particular information in the card image acquired by the acquisition unit 5401. The identification unit 1402 may be shown as in FIG. 16. FIG. 16 is a structural block diagram of a first implementation of the identification unit in the apparatus of extracting the particular information in the standard card provided by the present disclosure. Components of the identification unit are described herein in conjunction with FIG. 16.

A parameter acquisition unit 1-5021 acquires relative position parameters which reflect a relative position of the particular information in the standard card according to parameters of a standard card template.

A first transformation unit 1-5022 performs a homography matrix transformation based on the card image extracted from the acquisition unit 1401 and a shape of a standard card template image to acquire a transformed card image.

A clipping unit 1-5023 clips an image region in conformity with the relative position parameters from the transformed card image of the first transformation unit 1-5022 according to the relative position parameters of the particular information on the standard card template acquired by the parameter acquisition unit, the image region being the image region containing the particular information.

Figure 17:
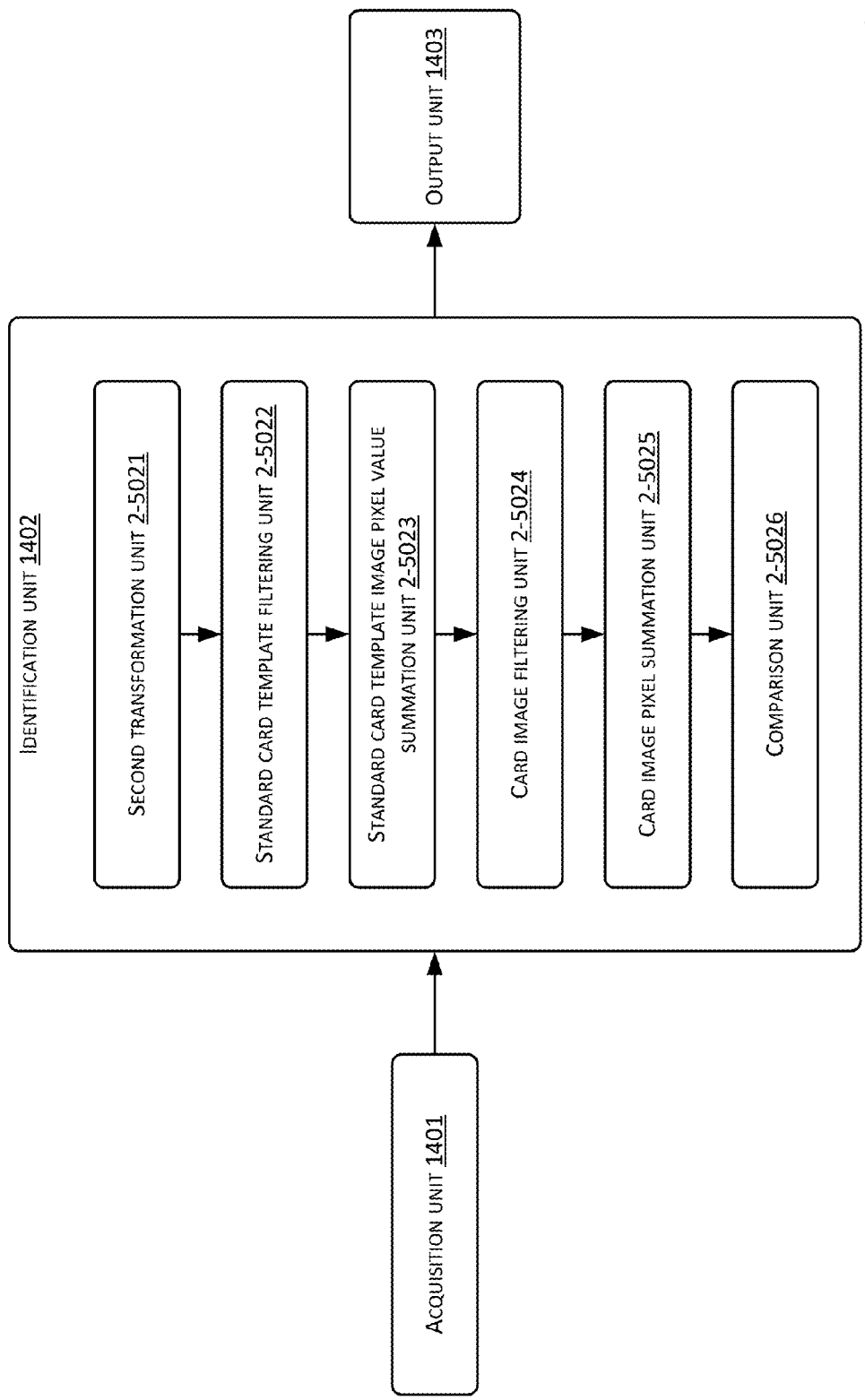
FIG. 17 is a structural diagram of an identification unit in the apparatus of extracting the particular information from the standard card in accordance with a second embodiment of the present disclosure.

When the identification unit 1402 of the present disclosure identifies the image region containing the particular information in the card image, an apparatus as shown in FIG. 17 may also be used for implementation. FIG. 17 is a structural block diagram of a second implementation of the identification unit in the apparatus of extracting the particular information in the standard card provided by the present disclosure.

The identification unit 1402 includes:
- a second transformation unit 2-5021 to perform a homography matrix transformation on the card image acquired by the acquisition unit 1401 according to a shape of an image of a standard card template to acquire a transformed card image;
- a standard card template filtering unit 2-5022 to filter the standard card template to acquire a filtered standard card template image;
- a standard card template image pixel value summation unit 2-5023 to acquire a first pixel value summation distribution diagram of the filtered standard card template image of the standard card template filtering unit 2-5022 in a recording direction of the particular information which needs to be extracted according to the recording direction;
- a card image filtering unit 2-5024 to filter the card image transformed by the second transformation unit 2-5021 to acquire a filtered card image;
- a card image pixel value summation unit 2-5025 to compute a sum of pixel values in the recording direction according to the filtered card image of the card image filtering unit 2-5024 based on the recording direction of the particular information to acquire a second pixel value summation distribution diagram of the card image in the recording direction; and
- a comparison unit 2-5026 to receive and compare the first pixel value summation distribution diagram and the second pixel value summation distribution diagram, locate, in the second pixel value summation distribution diagram, a position having a same pixel value summation feature in the recording direction of the particular information in the first pixel value summation distribution diagram, and identify thereof as the image region containing the particular information in the card image.

Figure 18:
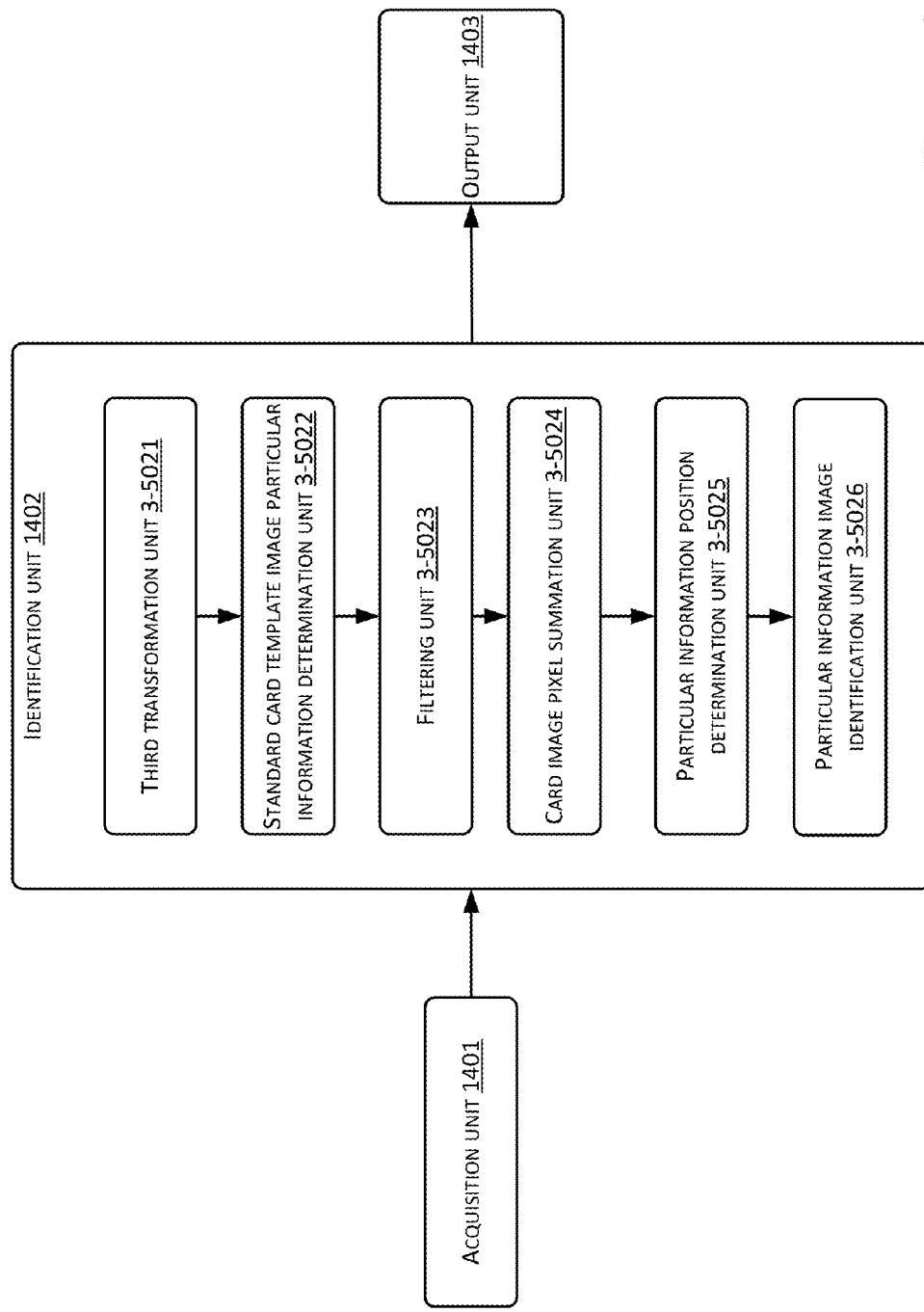
FIG. 18 is a structural block diagram of an identification unit in the apparatus of extracting the particular information from the standard card in accordance with a third embodiment of the present disclosure.

When the identification unit 1402 of the present disclosure identifies the image region containing the particular information in the card image, an apparatus as shown in FIG. 18 may be used for implementation. FIG. 18 is a structural block diagram of a third implementation of the identification unit in the apparatus of extracting the particular information in the standard card provided by the present disclosure.

The identification unit 1402 includes:
- a third transformation unit 3-5021 to perform a homography matrix transformation on the card image according to a shape of a standard card template image to acquire a transformed card image;
- a standard card template image particular information determination unit 3-5022 to determine a size occupied by the particular information of the standard card template image in the standard card template image based on parameters of the standard card template image;
- a filtering unit 3-5023 to filter the card image transformed by the transformation unit to acquire a filtered card image;
- a card image pixel summation unit 3-5024 to compute a pixel value summation in a recording direction of the particular information on the card image filtered by the filtering unit based on the recording direction to acquire a pixel value summation distribution diagram of the card image in the recording direction;
- a particular information position determination unit 3-5025 to determine a position of the particular information on the pixel summation distribution diagram according to the size occupied by the particular information of the standard card template image in the standard card template image; and
- a particular information image identification unit 3-5026 to map the position of the particular information in the pixel summation distribution diagram to the transformed card image, and extract the image region containing the particular information of the transformed card image from a range region.

The particular information position determination unit 3-5025 includes (not shown in the figure):
- a position range computation unit to multiply the size of the particular information by a range coefficient to compute a position range of the particular information in the pixel summation distribution diagram;
- a peak value selection unit to select a peak value within the position range of the pixel summation distribution diagram; and
- a range region selection unit to select the range region in the pixel summation distribution diagram according to the size of the particular information using the peak value as a center, and map the range region to the transformed card image.

On the above basis, the present disclosure further provides a method of inputting particular information in a standard card in a mobile terminal. The method stores standard card templates in the mobile terminal, and outputs an extracted image region containing particular information to a corresponding interface of the mobile terminal by using the foregoing method of extracting the particular information in the standard card, for example. For example, the particular information is information of a bank card number. When a payment is made through a mobile phone or other mobile terminals, an image region containing the card number is outputted to a corresponding position region of a payment page upon an interface of the payment page is entered. After the image region is outputted, the particular information of the image region may be inputted into a text box in the payment interface in a textual form. This input method may identify and display the particular information in the text box manually or using an OCR technology.

Therefore, in a process of manual input, a user may just input the particular information by referring to the particular information displayed on the payment page, such that a reference mode in the input process becomes more convenient and an input error rate is reduced. When performing identification through the OCR technology, the user may check the identified particular information in the text box by referring to the particular information image displayed on the payment page, which also makes the process of checking by reference convenient and simple.

Although the present disclosure discloses the exemplary embodiments above, the exemplary embodiments are not construed as limitations to the present disclosure. Any one skilled in the art can make possible changes and modifications thereto without departing from the spirit and scope of the present disclosure. Therefore, the protection scope of the present disclosure should be the scope defined by the claims of the present disclosure.

One skilled in the art should understand that the embodiments of the present disclosure can be provided as a method, an apparatus or a product of a computer program. Therefore, the present disclosure can be implemented as an embodiment of only hardware, an embodiment of only software or an embodiment of a combination of hardware and software. Moreover, the present disclosure can be implemented as a product of a computer program that can be stored in one or more computer readable storage media (which includes but is not limited to, a magnetic disk, a CD-ROM or an optical disk, etc.) that store computer-executable instructions.

The invention claimed is:

1. A method implemented by one or more computing devices, the method comprising:
    acquiring a card image of a standard card containing particular information to be extracted;
    identifying an image region containing the particular information in the card image, the identifying the image region including:
        performing a homography matrix transformation on the card image based on a shape of a standard card template image to acquire a transformed card image,
        filtering the standard card template image to acquire a filtered standard card template image,
        acquiring a first pixel value summation distribution diagram of the standard card template image in a recording direction of the particular information to be extracted based on the recording direction,
        filtering the transformed card image to acquire a filtered card image,
        performing a pixel value summation computation in the recording direction of the particular information in the filtered card image based on the recording direction to acquire a second pixel value summation distribution diagram of the card image in the recording direction, and
        comparing the second pixel value summation distribution diagram with the first pixel value summation distribution diagram, locating, in the second pixel value summation distribution diagram, a position having a same pixel value summation feature in the recording direction of the particular information in the first pixel value summation distribution diagram, and identifying thereof as the image region containing the particular information in the card image; and
    extracting and outputting the image region as an independent image.

2. The method of claim 1, wherein acquiring the card image of the standard card includes:
    acquiring a source image of the card image of the standard card containing the particular information to be extracted;
    defining a region of the card image in the source image; and
    extracting image information of the region of the card image in the source image as the card image of the standard card containing the particular information to be extracted.

3. The method of claim 2, wherein defining the region of the card image in the source image includes:
    extracting image elements that are straight line segments and have a length greater than a set threshold in the source image;
    combining the extracted straight line segments to determine combinations of line segments that are capable of forming a quadrilateral;
    extending lengths of a plurality of line segments to determine positions of intersection points of the plurality of line segments in each combination of the combinations of line segments that are capable of forming the quadrilateral;
    selecting one or more combinations of line segments satisfying a first condition, the first condition comprising a condition that the intersection points of the plurality of line segments are located within a range of the source image;
    determining whether only one combination of line segments satisfies the first condition; and
    in response to determining that only one combination of line segments satisfies the first condition, defining a region framed by the only one combination of line segments as the region of the card image in the source image.

4. The method of claim 3, wherein: in response to determining that multiple combination of line segments satisfy the first condition, the method further comprises:
    extracting the multiple combinations of line segments that satisfy the first condition;
    screening the multiple combinations of line segments that satisfy the first condition based at least in part on a second condition, the screening comprising:
        determining, in a respective combination of line segments of the multiple combinations of line segments, whether intersection points of line segments are on respective extension lines of the line segments, and taking the respective combination of line segments as a candidate combination of line segments if affirmative;
        determining whether only one candidate combination of line segments exists; and
        in response to determining that only one candidate combination of line segments exists, defining a region framed by the only one candidate combination of line segments as the region of the card image in the source image.

5. The method of claim 4, wherein a determination result is negative in the determining of whether only one candidate combination of line segments exists, screening candidate combinations of line segments by:
    acquiring intersection points of line segments in a combination of line segments, the combination of line segments including four intersection points;
    obtaining image coordinates of the four intersection points, mapping the image coordinates of the four intersection points to image coordinates of four points of a standard card template image to obtain a homography matrix, forming X and Y axes from two line segments using the homography matrix and using each intersection point in the four intersection points as an original point, computing unit vectors of X' and Y' axes corresponding to the X and Y axes in the image after a homography matrix transformation, and computing a degree of an included angle between two unit vectors;
    determining whether the acquired degree of the included angle between the two unit vectors in a combination of line segments is different from ninety degrees by an amount less than a preset threshold; and
    defining a region framed by the combination of line segments as the region of the card image in the source image if affirmative.

6. The method of claim 1, wherein identifying the image region containing the particular information in the card image further includes:

acquiring relative position parameters that reflect a relative position of the particular information in the standard card based on parameters of a standard card template image;

clipping an image region in conformity with the relative position parameters in the transformed card image based on the relative position parameters of the particular information in the standard card template image, the clipped image region being the image region containing the particular information.

7. The method of claim 1, wherein the standard card comprises a bank card, the particular information comprises a card number and a peak region of the second pixel value summation distribution diagram is used as the image region containing the particular information.

8. The method of claim 7, wherein the card number is produced by embossing.

9. The method of claim 1, wherein relative position parameters of the particular information in the standard card template image are simultaneously referenced when locating the position having the same pixel value summation feature in the recording direction of the particular information in the pixel value summation distribution diagram of the standard card template image.

10. The method of claim 1, wherein identifying the image region containing the particular information in the card image further includes:

determining a size occupied by the particular information of the standard card template image in the standard card template image based on parameters of the standard card template image;

determining a range region of the particular information in the pixel value summation distribution diagram according to the size occupied by the particular information on the standard card template image; and mapping a position of the particular information in the pixel value summation distribution diagram to the transformed card image, and extracting the image region containing the particular information of the transformed card image from the range region.

11. The method of claim 10, wherein determining the range region of the particular information in the pixel value summation distribution diagram according to the size occupied by the particular information in the standard card template image includes:

multiplying a size of the particular information by a range coefficient to compute a position range of the particular information in the pixel summation distribution diagram;

selecting a peak value within the position range of the pixel summation distribution diagram; and selecting the range region in the pixel summation distribution diagram according to the size of the particular information using the peak value as a center, and mapping the range region to the transformed card image.

12. The method of claim 1, wherein after extracting and outputting the image region as the independent image, an OCR technology is used to perform information identification on the outputted image region to acquire a textual form of recorded information.

13. An apparatus comprising:
one or more processors;
memory;
an acquisition unit stored in the memory and executable by the one or more processors to acquire a card image of a standard card containing particular information to be extracted;
an identification unit stored in the memory and executable by the one or more processors to identify an image region containing the particular information in the card image acquired by the acquisition unit, the identification unit identifying an image region by:
performing a homography matrix transformation on the card image based on a shape of a standard card template image to acquire a transformed card image,
filtering the standard card template image to acquire a filtered standard card template image,
acquiring a first pixel value summation distribution diagram of the standard card template image in a recording direction of the particular information to be extracted based on the recording direction,
filtering the transformed card image to acquire a filtered card image,
performing a pixel value summation computation in the recording direction of the particular information in the filtered card image based on the recording direction to acquire a second pixel value summation distribution diagram of the card image in the recording direction, and
comparing the second pixel value summation distribution diagram with the first pixel value summation distribution diagram, locating, in the second pixel value summation distribution diagram, a position having a same pixel value summation feature in the recording direction of the particular information in the first pixel value summation distribution diagram, and identifying thereof as the image region containing the particular information in the card image; and
an output unit stored in the memory and executable by the one or more processors to clip and output the image region identified by the identification unit as an independent image.

14. The apparatus of claim 13, wherein the acquisition unit includes:
a source image acquisition unit to acquire a source image of the card image of the standard card containing the particular information to be extracted;
a defining unit to define a region of the card image in the source image acquired by the source image acquisition unit; and
an extraction unit to extract image information from the region defined by the defining unit as the card image of the standard card containing the particular information to be extracted.

15. The apparatus of claim 14, wherein the defining unit includes:
an image element extraction unit to extract image elements which are straight line segments and have a length greater than a set threshold in the source image;
a combination unit to combine the straight line segments extracted by the image element extraction unit and determine combinations of line segments that are capable of forming a quadrilateral;
an intersection point determination unit to extend lengths of four line segments in a combination of the combinations of line segments of the combination unit, and determine positions of intersection points of the line segments;

a first condition selection unit to take the intersection points of the line segments determined by the intersection point determination unit being within a range of the source image as a first condition, and select a combination of line segments that satisfies the condition;

a first condition determination unit to determine whether only one combination of line segments selected by the first condition selection unit satisfies the condition, and initiate a card image determination unit if affirmative; and the card image determination unit to define a region framed by the combination of line segments as the region of the card image in the source image.

16. The apparatus of claim 15, wherein: if a determination result of the first condition determination unit is negative, a first condition extraction unit is initiated, and wherein the first condition extraction unit extracts all combinations of line segments that are selected by the first condition selection unit and satisfy the first condition;

a second condition first judgment unit screens the combinations of line segments that are extracted by the first condition extraction unit according to a second condition by: determining whether intersection points of line segments are on respective extension lines of the line segments in a combination of line segments, and treating the line segments as a candidate combination of line segments if affirmative; and a second condition second determination unit determines whether only one combination of line segments that is acquired by the second condition first determination unit satisfies the second condition, and defines a region framed by the combination of line segments as the region of the card image in the source image if affirmative.

17. The apparatus of claim 16, wherein if a determination result is negative in the determination of whether only one combination of line segments exists by the second condition second determination unit, combinations of line segments that satisfy the second condition are screened by:

an intersection point acquisition unit to acquire intersection points of line segments in a combination of line segments from the second condition second determination unit, the combination of line segments including four intersection points;

a computation unit to obtain image coordinates of the four intersection points, and map image coordinates of four points of the standard card template image to the image coordinates of the four intersection points to obtain a homography matrix, compute X and Y axes that are formed from two line segments using the homography matrix and using each intersection point of the four intersection points as an original point, compute unit vectors of X' and Y' axes corresponding to the X and Y axes in the image after a homography matrix transformation, and compute an included angle between the unit vectors; and a threshold determination unit to determine whether the acquired included angle between the two unit vectors in a combination of line segments is different from ninety degrees by an amount less than a preset threshold, and define a region framed by the combination of line segments as the region of the card image in the source image if affirmative.

18. The apparatus of claim 13, wherein the identification unit comprises:

a parameter acquisition unit to acquire relative position parameters which reflect a relative position of the particular information in the standard card according to parameters of a standard card template image;

a transformation unit to perform a homography matrix transformation according to the card image extracted by the acquisition unit based on a shape of the standard card template image to acquire a transformed card image; and a clipping unit to clip an image region in conformity with the relative position parameters in the transformed card image according to the relative position parameters of the particular information in the standard card template that are acquired by the parameter acquisition unit, the clipped image region being the image region containing the particular information.

19. One or more computer readable media storing executable instructions that, when executed by one or more processors, cause the one or more processors to perform acts comprising:

storing a standard card template image in a mobile terminal;

acquiring a card image of a standard card containing particular information to be extracted;

identifying an image region containing the particular information in the card image, the identifying the image region including:
  performing a homography matrix transformation on the card image based on a shape of the standard card template image to acquire a transformed card image,
  filtering the standard card template image to acquire a filtered standard card template image,
  acquiring a first pixel value summation distribution diagram of the standard card template image in a recording direction of the particular information to be extracted based on the recording direction,
  filtering the transformed card image to acquire a filtered card image,
  performing a pixel value summation computation in the recording direction of the particular information in the filtered card image based on the recording direction to acquire a second pixel value summation distribution diagram of the card image in the recording direction, and
  comparing the second pixel value summation distribution diagram with the first pixel value summation distribution diagram, locating, in the second pixel value summation distribution diagram, a position having a same pixel value summation feature in the recording direction of the particular information in the first pixel value summation distribution diagram, and identifying thereof as the image region containing the particular information in the card image; and extracting the image region containing particular information from a standard card based at least in part on relevant parameters, a size and/or a shape of the standard card template image; and outputting the extracted image region containing the particular information.

* * * * *